United States Patent [19]
Morimoto et al.

[11] Patent Number: 5,801,813
[45] Date of Patent: Sep. 1, 1998

[54] IMAGE RECORDING METHOD AND APPARATUS

[75] Inventors: Yoshinori Morimoto; Matsuyuki Miwa, both of Kanagawa-ken, Japan

[73] Assignee: Fuji Photo Film Co., Ltd., Kanagawa-Ken, Japan

[21] Appl. No.: 734,641

[22] Filed: Oct. 21, 1996

[30] Foreign Application Priority Data

Oct. 20, 1995 [JP] Japan ................................. 7-272551
Jan. 31, 1996 [JP] Japan ................................. 8-016238
Jun. 17, 1996 [JP] Japan ................................. 8-155873

[51] Int. Cl.$^6$ ................................................ G03B 27/52
[52] U.S. Cl. ........................... 355/27; 355/77; 355/28
[58] Field of Search ........................... 355/27–29, 77, 355/68; 430/97, 270, 567; 396/569, 570, 578

[56] References Cited

U.S. PATENT DOCUMENTS

| | | | |
|---|---|---|---|
| 4,587,191 | 5/1986 | Clark | 430/97 |
| 4,837,601 | 6/1989 | Nakane et al. | 355/28 |
| 5,083,154 | 1/1992 | Terashita et al. | 355/68 |
| 5,206,133 | 4/1993 | Bando | 430/567 |
| 5,356,752 | 10/1994 | Cabrera et al. | 430/270 |

*Primary Examiner*—D. Rutledge

[57] ABSTRACT

A photosensitive material is two-dimensionally exposed to light modulated according to an image signal and developed so that the image represented by the image signal is recorded on the photosensitive material as a visible image. The exposed photosensitive material is developed a predetermined time after the exposure in which a latent image regression phenomenon of the photosensitive material is substantially stabilized.

6 Claims, 5 Drawing Sheets

IMAGE RECORDING METHOD AND APPARATUS

BACKGROUND OF THE INVENTION

1. Field of the Invention

This invention relates to an image recording method and apparatus for recording a visible image according to image signals obtained from a color image on a reflective original such as a photograph, a print or the like or a transmission original such as a negative film, a reversal film or the like.

2. Description of the Related Art

Recently there has been developed a digital photographic printer in which image information recorded on a photographic film such as a negative film, a reversal film or the like or a print is photoelectrically read out and is converted into a digital image signal, the digital image signal is subjected to various image processings and a photosensitive material such as a photographic paper is scanned by a recording light beam modulated according to the processed image signal, thereby recording a visible image on the photosensitive material.

In the digital photographic printer, editing of an image such as synthesis of a plurality of images into an image and division of an image, layout of an print image such as editing of characters and an image, and various image processings such as adjustment of color and/or density, adjustment of scale, contour enhancement and the like can be freely carried out, and a print freely edited or processed according to its purpose can be output. Further in a conventional print by surface exposure, it is impossible to reproduce the whole image density information carried by the film or the like due to limitation in the reproducible density range of a photosensitive material. However by the digital photographic printer, it is possible to reproduce the image density information carried by the film to almost 100%.

Such a digital photographic printer basically comprises a read-out means which reads out an image recorded on an original such as a photographic film, and an image recording which carries out an image processing on an image signal obtained in order to determine exposure conditions and the like which are used in recording a visible image, causes an exposure light beam to scan a photosensitive material according to the exposure conditions determined, develops the exposed photosensitive material and displays a visible image on a monitor.

In the read-out means, for instance, in the case of a slit scanning, a line reading light is projected onto the film while the film is fed in a direction perpendicular to the line reading light (or the reading light and the are moved), thereby two-dimensionally scanning the film. The transmission light which is transmitted through the film and carries thereon image information is focused on the light receiving face of the photoelectric converter element such as a CCD line sensor and is converted into an electric image signal. The electric image signal carrying thereon data on the amount of light is amplified and converted to a digital image signal through an A/D conversion. Then the digital image signal is subjected to various image processings such as compensation for fluctuation in properties of the CCD element, density conversion, adjustment of scale and the like and transferred to the image recording means.

In the image recording means, the image signal is reproduced as a visible image on a display such as a CRT. The operator observes the reproduced visible image and, if necessary carries out a gradation correction, a color/density correction and the like (setting of setup conditions) on the reproduced image, and transfers the corrected image signal to a printer or a monitor as a recording image signal when the reproduced image becomes satisfactory as a finished print.

In the printer, in the case of a raster scan (light beam scanning) image recording system, three color light beams, e.g., red, green and blue light beams, corresponding to photosensitive layers for the three colors formed in the photosensitive material are modulated according to the recording image signals and the modulated light beams are deflected in a main scanning direction while the photosensitive material is fed in a direction substantially normal to the main scanning direction (sub-scanning), whereby the photosensitive material is tow-dimensionally scanned by the modulated light beams and an image on the film is recorded on the photosensitive material as a visible image.

The photosensitive material is in the form of a roll in a continuous length and is fed drawn out from the roll. While the photosensitive material is fed, reference holes are punched out at predetermined intervals and a recording light beam modulated according to image signals corresponding to one frame of image is caused to scan the portion between each pair of adjacent reference holes. When exposed to the recording light beam, a latent image is formed on the photosensitive material.

After exposure to the recording light beam, the photosensitive material is cut into lengths each corresponding to one frame or several frames and the pieces of the photosensitive material are transferred to a developing means and subjected to a development processing according to the kind of the photosensitive material. For example, when the photosensitive material is a silver salt photosensitive material, development, bleaching, fixing, water washing and drying are carried out in sequence and then finished prints are output.

Generally a photosensitive material exhibits a latent image regression phenomenon, that is, a phenomenon that the density of the latent image changes in a few minutes after exposure. As shown in FIGS. 3 and 4, the density of the latent image varies by a large amount in one to two minutes after exposure and then the variation of the density gradually converges on a certain value. Accordingly even if the exposure conditions are the same, the density of the image finally obtained varies according to the time from exposure to development, which results in fluctuation in quality of products.

SUMMARY OF THE INVENTION

In view of the foregoing observations and description, the primary object of the present invention is to provide an image recording method and apparatus in which reproduced images of a constant quality can be obtained irrespective of a latent image regression phenomenon of the photosensitive material.

In accordance with an aspect of the present invention, there is provided an image recording method comprising the steps of two-dimensionally exposing a photosensitive material to light modulated according to an image signal and developing the exposed photosensitive material so that the image represented by the image signal is recorded on the photosensitive material as a visible image, wherein the improvement comprises that said exposed photosensitive material is developed a predetermined time after the exposure in which a latent image regression phenomenon of the photosensitive material is substantially stabilized.

In accordance with another aspect of the present invention, there is provided an image recording apparatus comprising an exposure means for two-dimensionally exposing a photosensitive material to light modulated according to an image signal, a developing means for developing the exposed photosensitive material so that the image represented by the image signal is recorded on the photosensitive material as a visible image, and a transfer means which transfers the exposed photosensitive material from the exposure means to the developing means, wherein the improvement comprises

- a timer means which detects a lapse of a predetermined time after the exposure in which a latent image regression phenomenon of the photosensitive material is substantially stabilized, and
- a control means which controls the transfer means to transfer said exposed photosensitive material to the developing means after the lapse of a predetermined time after the exposure.

In accordance with the present invention, since the exposed photosensitive material is developed after the latent image regression phenomenon of the photosensitive material is substantially stabilized, the density of the image formed on the photosensitive material by development is less affected by the latent image regression phenomenon and accordingly the quality of the reproduced images can be substantially constant.

DESCRIPTION OF THE PREFERRED EMBODIMENT

Figure 1:
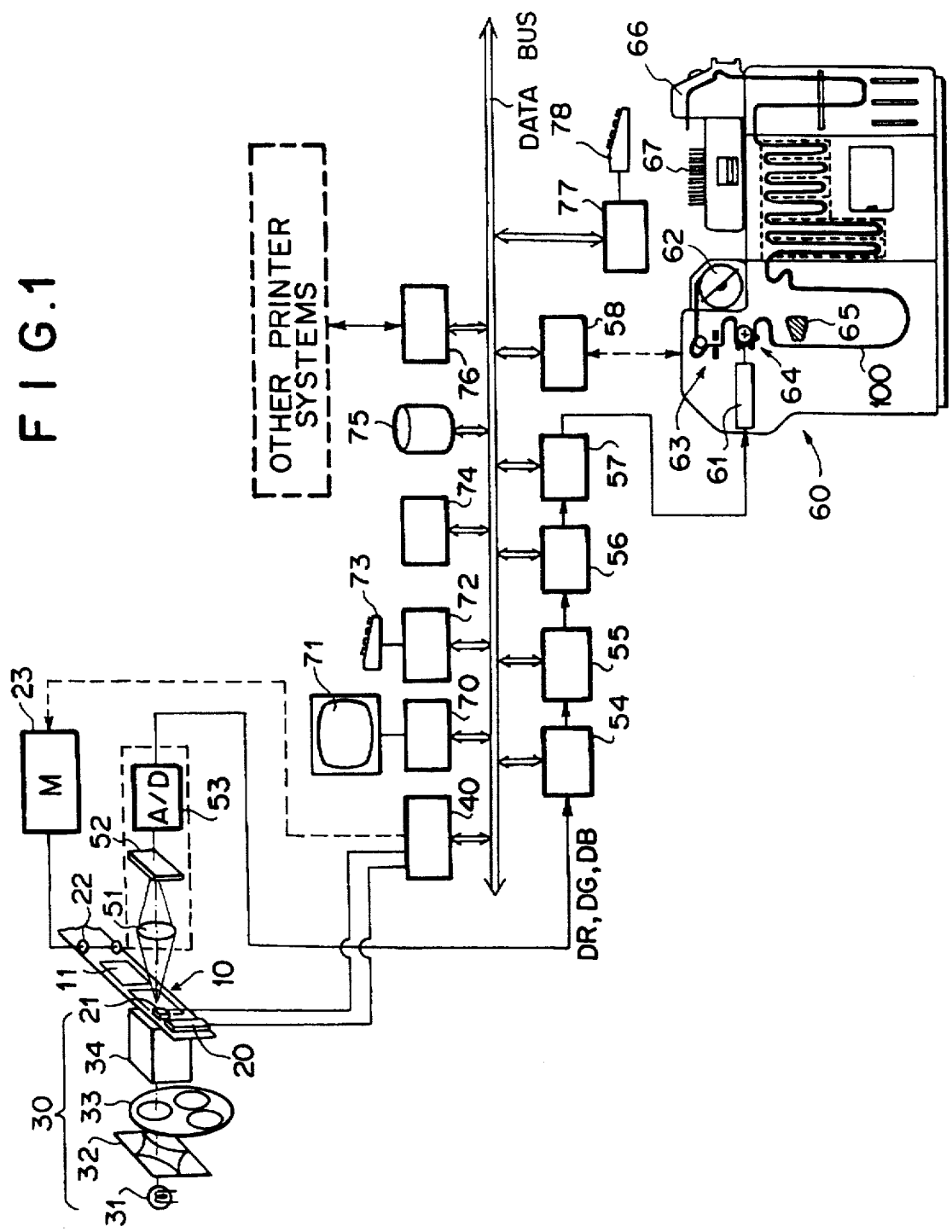
FIG. 1 is a schematic view showing a digital photographic printer provided with an image recording means for carrying out the method of the present invention.

In FIG. 1, a digital photographic printer 100 is provided with a bar code reader 42 which reads out bar codes on a film 10, a frame sensor 41 which detects frames (exposures) on the film 10 on the basis of change in density, a sprocket 44 which is in mesh with perforations of the film 10 and is rotated to feed the film 10, a motor 43 which drives the sprocket 44, and a film scanner control interface 40 which sends the film number and the frame numbers read by the bar code reader 42 to a data bus and outputs a motor control signal to the motor 43. The photographic printer 100 is further provided with a light source unit 30 which comprises a light source 31 for projecting reading light onto the frames 11 of the film 10, a light control unit 32, a color separation unit 33 and a diffusion box 34, a CCD 52 which photoelectrically reads an image (transmission image) recorded on the frame 11, onto which the reading light is projected, through an image forming optical system 51, an A/D convertor 53 which converts an image signal representing the image on the frame 11 output from the CCD 52 to a digital image signal S, a first image processing system 54 which carries out necessary corrections for compensating for influence of shading, a dark current or the like on the digital image signal S output from the A/D convertor 53 and outputs a high quality image signal to a frame memory 55, a second image processing system 56 which carries out a predetermined image processing on the processed digital image signal S stored in the frame memory 55, and a modulator driver 57 which outputs a modulation signal on the basis of the digital image signal S processed with a changed parameter by the second image processing system 56. The photographic printer is further provided with a printer 60 which reproduces a visible image based on the modulation signal output from the modulator driver 57, a printer interface 58, a hard disk 75 which stores the digital image signal stored in the frame memory 55 by way of the data bus, a CRT monitor 71 which reproduces, as needed, a visible image based on the digital image signal S and displays image processing conditions and the like, a display interface 70, a keyboard 73 for inputting image processing conditions, correction values for the image processing conditions, an image retrieval information and the like, a keyboard interface 72, a CPU (central processing unit) 74, a communication port 76 which is connected to other digital photographic printer systems through a communication line, a keyboard 78 which is disposed in a check section for checking photographic prints reproduced by the printer 60 and is for inputting, as needed, a reprint instruction and a keyboard interface 77. The CPU 74 carries out mapping of the image retrieval information including the frame numbers read by the bar code reader 21, the image processing conditions input from the first and second image processing systems 54 and 56 and the digital image signal S input from the frame memory 55 and then stores them in the hard disk 75 by way of the data bus. Further the CPU 74 retrieves from the data bus a digital image signal S corresponding to image retrieval information input from the keyboard 73 and controls it, and controls the instruments connected to the data bus.

Specifically the film 10 is held by a carrier and as an auto-carrier for handling negative films, those which have been used in conventional mini-laboratories (NC135S manufactured by Fuji Film) may be used. By the auto-carrier, images in full size, panoramic size, impressive size and the like can be read out according to the printing format. When those which have been used in conventional mini-laboratories as a trimming carrier, enlargement of about 1.4× is possible about the center. Further as a reversal film carrier, those disclosed in Japanese Patent Application Nos. 7(1995)-271048, 7(1995)-275358, 7(1995)275359, 7(1995)-277455, and 7(1995)-285015 may be used.

In the image processing system, not only the processings such as gradation correction, color conversion, density conversion and the like but also a processing for improving the sharpness of the image while suppressing the graininess of the film as disclosed in U.S. Ser. No. 08/598,918 can be carried out. Further an automatic masking printing processing which can reproduce a high quality visible image from an image signal obtained from an image having a large contrast as disclosed in Japanese Patent Application No. 7(1995)-165965 can also be carried out.

The hard disk 75 has a storage capacity not smaller than 25 GB. Generally an image signal required for obtaining a resolution equivalent to a photographic print of L size (about 9 cm×13 cm) is about 5 MB/frame. When the image signal is compressed to such an extent that does not deteriorate the image quality, it becomes 1 MB/frame. In an average mini-laboratory, working days may be set 25 days/month, the number of films brought in the laboratory may be set 50/day and the number of exposures per film may be set 20. Accordingly, when it is assumed that image signals are deleted in sequence when one month lapses since the film is brought in, the hard disk 75 should have a storage capacity of 25 GB.

The printer 60 comprises a printing section, a developing section and a drying section. The printing section comprises a magazine 62 which stores a roll of photographic paper 20 in a continuous length. The magazine 62 may be of a type used in normal mini-laboratories such as described, for instance, in Japanese Unexamined Patent Publication No. 6(1994)-161050.

The drying section comprises a cutter 66 which cuts the exposed photographic paper 20 frame by frame after drying and a sorter 67 which arranges in order the prints thus cut from the exposed photographic paper 20. The sorter 67 may be of a type shown in Japanese Unexamined Patent Publication No. 4(1992)-199052. The developing section and the drying section may be integrated into a processing unit which may be a mini-laboratory model 10 ME(2). See "Twenty-five Year History of Laboratory Instruments" (February, 1994, Fuji Film), a service manual, a handling manual for basic operation, a handling manual for supervisory, a handling manual for advanced operation, an install guide and a parts list for "mini-laboratory champion printer processor SUPER FA-257 PP1257VR PP1257V SUPER FA-277 PP1827 VR PP1827V" (Fuji Film, September, 1995). The printing section will not be described in detail here.

Operation of the digital photographic printer 100 will be described, hereinbelow. The CPU 74 first drives the motor 43 by way of the film scanner control interface 40, thereby feeding the film 10 (negative film) by way of the sprocket 44.

While the sprocket 44 is feeding the film 10, the frame sensor 41 reads the density of the film 10 to seek for the region where an exposure (frame) 11 exists and the film scanner control interface 40 controls the motor 43 by way of the CPU 74 on the basis of the density information read by the frame sensor 41 to stop the first exposure 11 in a predetermined read-out position.

When the frame sensor 41 detects the first exposure 11 and the first exposure 11 is stopped in the predetermined read-out position, light emitted from the light source unit 30 is projected onto the exposure 11 and a transmission image of the exposure 11 enters the image forming optical system 51, whereby a predetermined image is formed on the image receiving face of the CCD 52. The CCD 52 reads the image and photoelectrically converts it into a predetermined image signal. The image signal is digitized by the A/D convertor 53, whereby a digital image signal made up of digital image signal components for the respective picture elements is obtained. The digital image signal is input into the first image processing system 54 and is removed with influence of shading and/or dark current. The digital image signal processed by the first image processing system 54 is once stored in the frame memory 55.

The image signal once stored in the frame memory 55 is input into the second image processing system 56. In the second image processing system 56, a predetermined image processing is carried out on the image signal and the processed image signal is input into the printing section of the printer 60, where the following processing is carried out.

Figure 2:
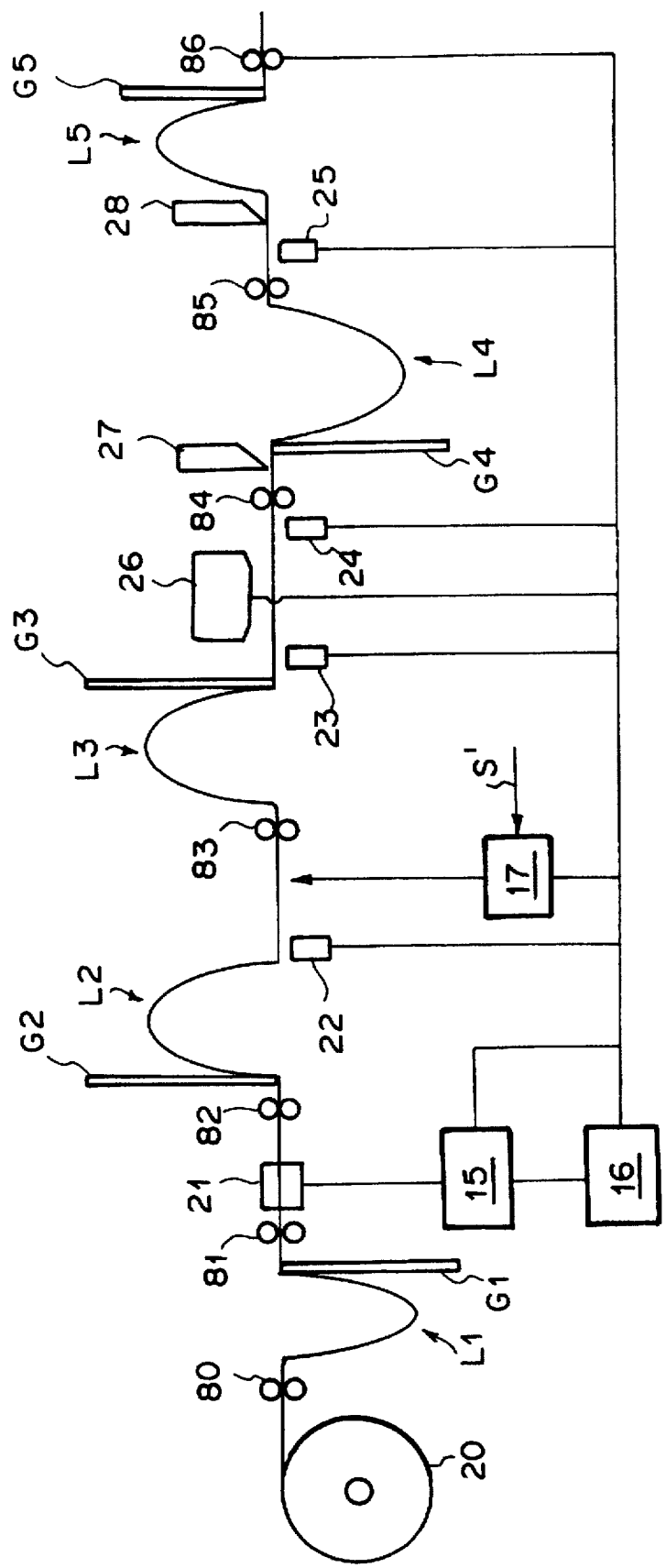
FIG. 2 is a schematic view showing the image recording means.

As shown in FIG. 2, the printing section comprises conveyor rollers 80, 81, 82, 83, 84, 85 and 86 for feeding the photosensitive material 20 in the form of a roll, a hole punch 21 which punches out holes for partitioning the frames to be recorded, an image recording section 17 for recording a latent image of the image represented by the image signal, a back printing section 26 which records a back print on the photosensitive material 20 as required, first and second cutters 27 and 28 for cutting the photosensitive material 20 into pieces of required sizes, sensors for detecting the holes formed in the photosensitive material 20, a print control information storage section 15 which, each time a hole is punched out by the hole punch 21, stores print control information on the print size of the frame corresponding to the hole, whether a margin is to be left for the frame, waiting from exposure to development and the like, and a control section 16 for controlling the image recording means.

First to fifth loops L1 to L5 are formed respectively on the upstream sides of the hole punch 21, the image recording section 17, the back print section 26, the second cutter 28 and a developing means 100 to be described later. First to fifth guide plates G1 to G5 are formed respectively for the first to fifth loops L1 to L5.

Operation of the printing section shown in FIG. 2 will be described hereinbelow. The photosensitive material 20 fed out from the roll by the rollers 80 and 81 once waits in the first loop L1 for adjustment of delivery. Thereafter, the hole punch 21 punches out holes in the photosensitive material 20 at intervals corresponding to the widths of the frames printed. When each hole is punched out, print control information for the frame between the hole and the hole just downstream thereof is stored in the print control information storage section 15.

The print control information is related to the print size of the frame, whether a margin is to be left for the frame, waiting from exposure to development and the like and stored frame by frame.

The punched photosensitive material 20 is fed to the image recording section 17 by the rollers 82. Again the photosensitive material 20 once waits in the second loop L2 for adjustment of delivery. In the image recording section 17, the sensor 22 detects the recording order of the frames and the print control information is read out from the print control information storage section 15 by the control section 16 according to the detected recording order and input into the image recording section 17. The image recording section 17 records the image represented by the processed image signal on the photosensitive material 20 by a light beam according to the print control information input. That is, the light beam is modulated according to the processed image signal and caused to two-dimensionally scan the photosensitive material 20, thereby recording the image in a size according to the print control information. When a margin is to be left for the frame, the image is so recorded on the photosensitive material 20.

After completion of exposure, information on waiting from exposure to development is added to the print control information.

Then the exposed photosensitive material 20 is fed to the back printing section 26 by the rollers 83. Again the photosensitive material 20 once waits in the third loop L3 for adjustment of delivery. In the back printing section 26, the sensor 23 detects the back printing order of the frames and the print control information is read out from the print control information storage section 15 by the control section 16 according to the detected back printing order and input into the back printing section 26. The back printing section 26 records back print on each of the frames on the photosensitive material 20 according to the print control information input.

After the back print, the photosensitive material 20 is fed to the first cutter 27 by the rollers 84. The first cutter 27 cuts the photosensitive material 20 at a hole detected by the sensor 24 after printing of all the frames is completed and accordingly is not operated while recording of images goes on. The photosensitive material 20 is further fed to the second cutter 28 by the rollers 85. The order of the frames on the photosensitive material 20 is detected by the sensor 25 and the control section 16 reads out the print control information corresponding to the frame from the print control information storage section 15. Then the control section 16 refers to the print control information read out for the information on waiting from exposure to development and stops the rollers 85 to cause the photosensitive material 20 to wait until the waiting time represented by the information lapses. Then the second cutter 28 cuts the photosensitive material 20 into lengths of several to several tens of frames at the position of the holes detected by the sensor 25 after the lapse of the waiting time.

Figure 3:
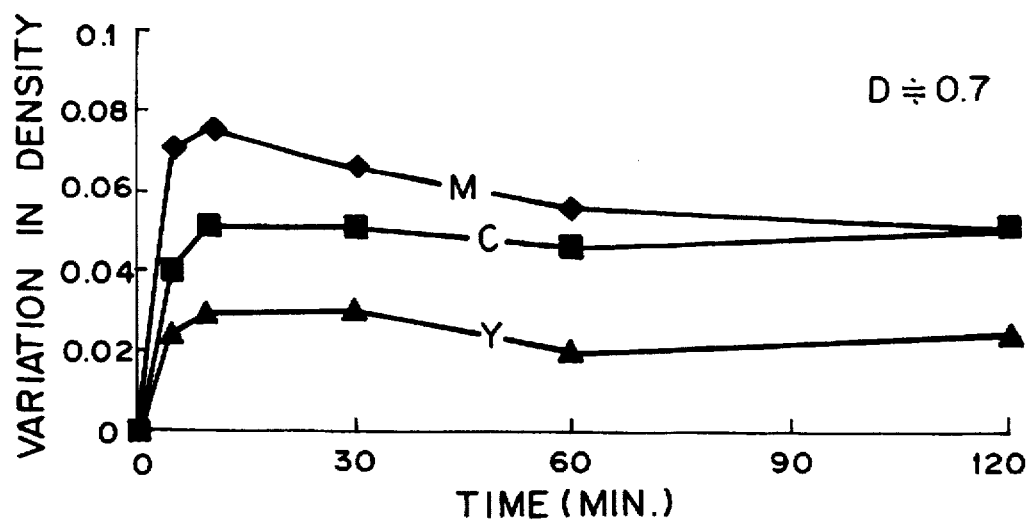
FIGS. 3 and 4 are graphs showing the latent image regression phenomena of the photosensitive material.
Figure 4:
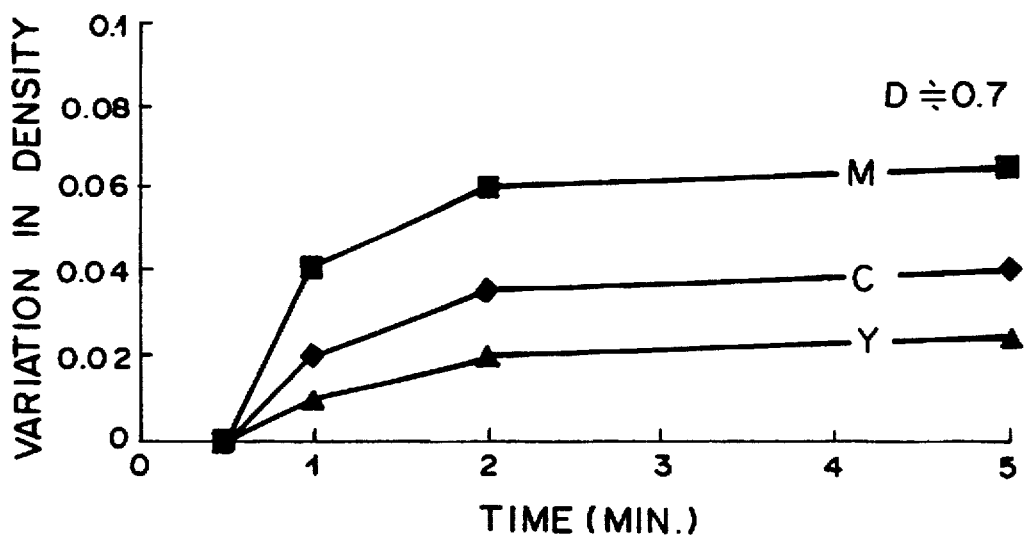

That is, as shown in FIGS. 3 and 4, a photosensitive material exhibits a latent image regression phenomenon, that is, a phenomenon that the density of the latent image changes in a few minutes after exposure. As shown, for instance, in FIG. 4, the density of the latent image varies by a large amount in one to two minutes after exposure and then the variation of the density gradually converges on a certain value. Accordingly even if the exposure conditions are the same, the density of the image finally obtained varies according to the time from exposure to development, which results in fluctuation in quality of products. Accordingly, in accordance with the present invention, information on the time from the end of exposure to initiation of development is added to the print control information and development is initiated after a predetermined time lapses after exposure. In FIGS. 3 and 4, the latent image regression phenomenon is shown as a target value of density is set to about 0.7.

The control section 26 drives the rollers 86 to feed the cut pieces of the photosensitive material to the developing section shown in FIG. 1 after the waiting time carried by the print control information lapses. A feeding means shown in Japanese Patent Application No. 2(1990)-272722 may be used to feed the cut pieces of the photosensitive material to the developing section, and a developing tank shown in Japanese Patent Application No. 4(1992)-155333 may be used.

In the developing section, the cut pieces of the photosensitive material are developed and the images represented by the image signals are recorded.

In accordance with the present invention, since the exposed photosensitive material 20 is developed after the lapse of a predetermined time in which the latent image regression phenomenon of the photosensitive material 20 is substantially stabilized, the density of prints obtained less fluctuates from print to print and the quality of the prints can be substantially constant.

After completion of exposure of all the frames, the photosensitive material 20 is cut off by the first cutter 27.

Though, in the embodiment described above, the time in which the photosensitive material pieces are developed after lapse of the waiting time is not controlled, such a time may be stored as a piece of print control information so that the photosensitive material pieces are developed in the time. That is, though the latent image regression phenomenon is substantially stabilized in one to two minutes after exposure as shown in FIGS. 3 and 4, the density of the latent image slightly varies with time. Accordingly, by controlling the time before initiation of development, the influence of the latent image regression phenomenon can be further reduced and prints of higher quality can be obtained.

The scanning optical system employed in the printer 60 will be described in detail, hereinbelow.

Figure 5:
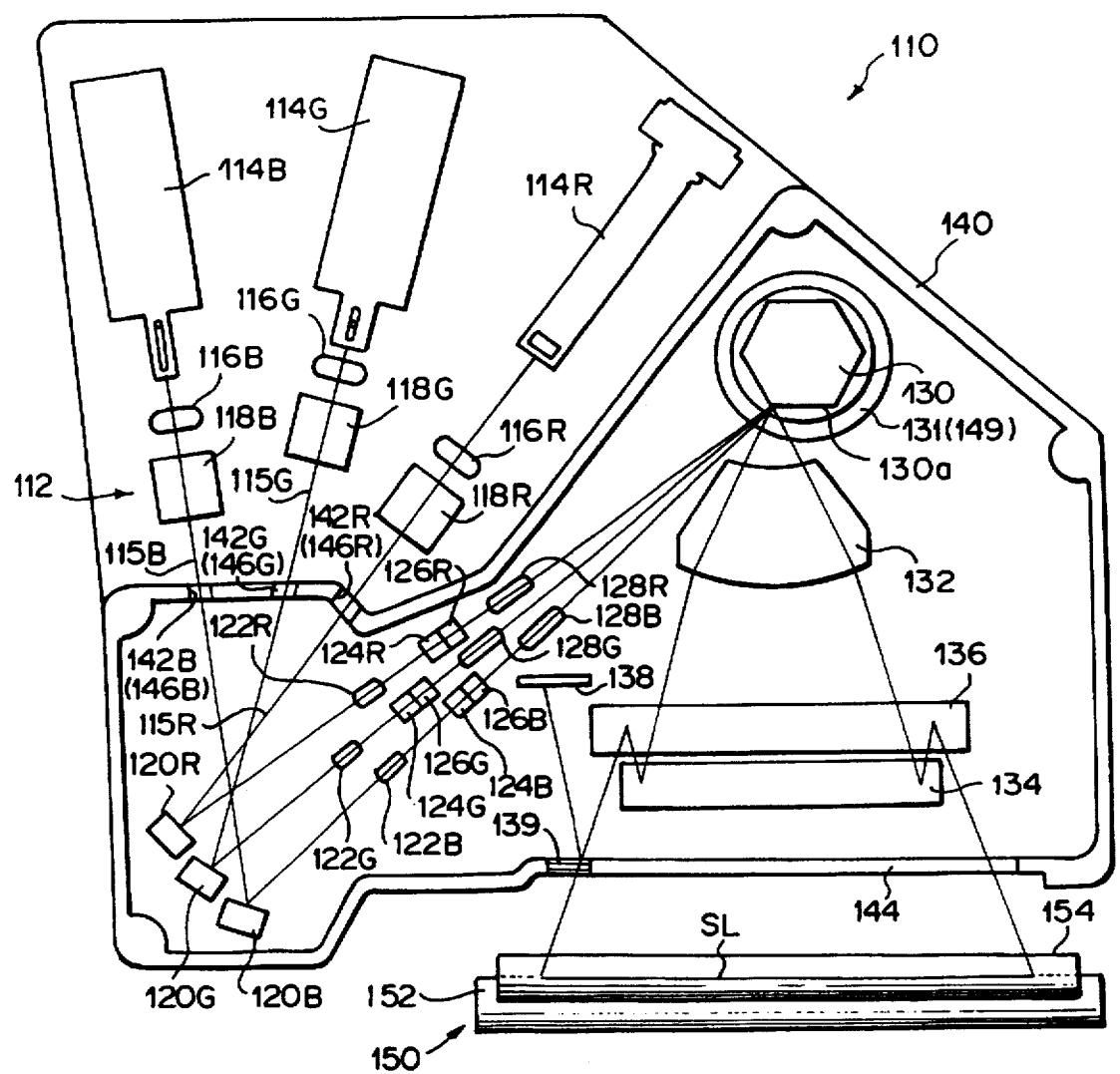
FIG. 5 is a schematic plan view of the scanning optical system employed in the photographic printer.
Figure 6:
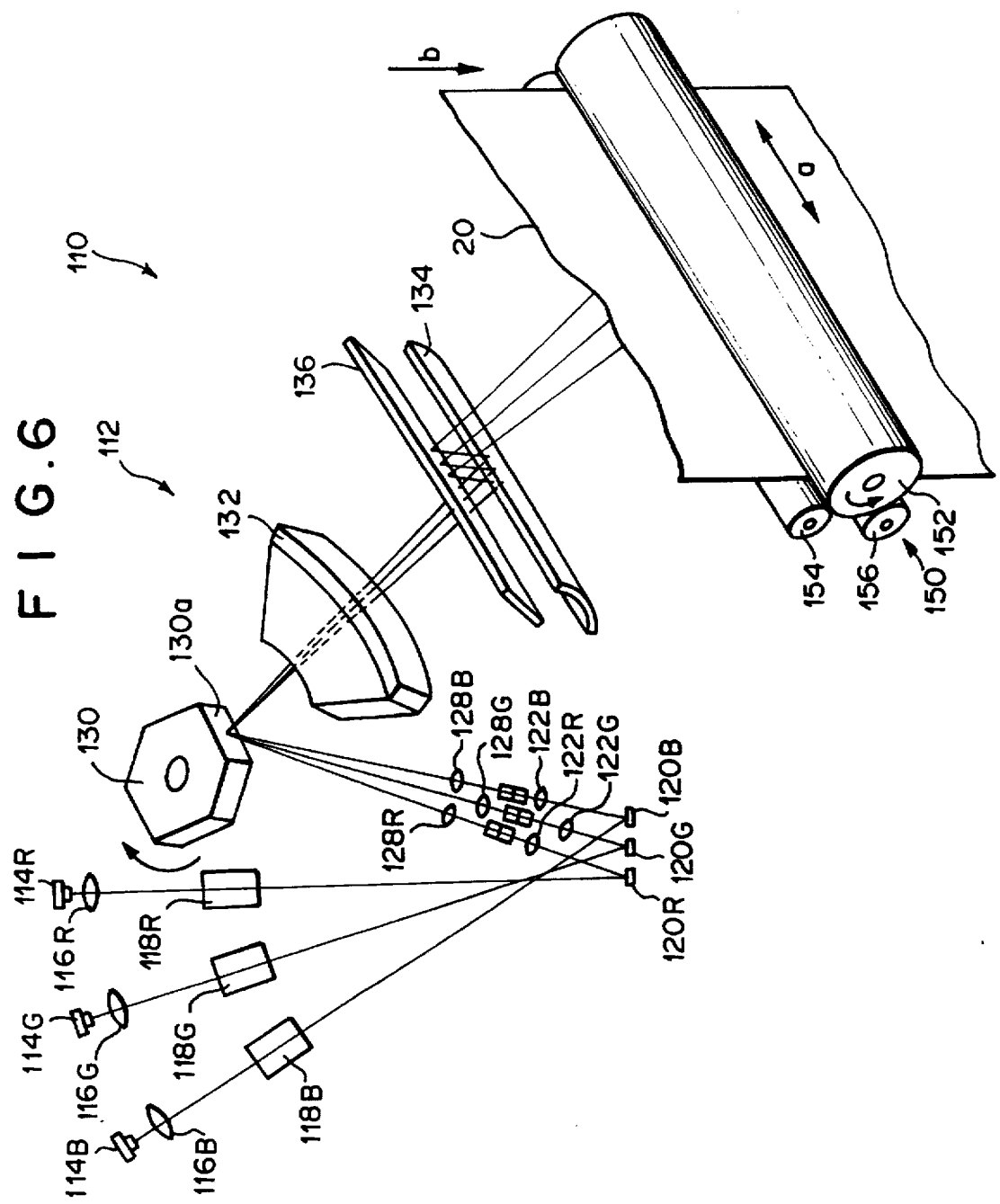
FIG. 6 is a schematic perspective view of the scanning optical system.

FIG. 5 is a schematic plan view showing the scanning optical system with an upper portion of its closed-type housing removed, and FIG. 6 is a schematic perspective view showing the light beam scanning optical system and the sub-scanning conveyor system of the scanning optical system.

The scanning optical system 110 shown in FIGS. 5 and 6 comprises a main scanning section 112 having a plurality of optical elements forming a light beam scanning optical system, an closed-type housing 140 in which a part of the optical elements of the main scanning section 112 is contained isolated from outer atmosphere, and a sub-scanning section 150 which conveys the photosensitive material 20 in a continuous length in a direction (the direction of arrow b in FIG. 6) substantially normal to a main scanning direction (the direction of arrow a in FIG. 6) in which light beams are caused to scan the photosensitive material 20 by the main scanning section 112 as will be described below. Light beams of three primary colors are modulated according to the image signals for the three primary colors and caused to the photosensitive material 20 in the main scanning direction by the main scanning section 112 while the photosensitive material 20 is conveyed in the sub-scanning direction by the sub-scanning section 150 while held in a predetermined exposure position, thereby two-dimensionally scanning the photosensitive material 20 by the three light beams and recording a latent image thereon.

In this particular example, the photosensitive material 20 is a normal color photosensitive material which has a wavelength-dependent spectral sensitivity and the peaks of the spectral sensitivities for the three primary colors of which are in the visible light range. The main scanning section 112 comprises an optical system which the three color laser beams enter at different angles and in which the laser beams are not combined with each other. That is, the main scanning section comprises a semiconductor laser 114R which emits a laser beam for forming red, a wavelength conversion laser (G-SHG) 114G which employs a SHG (second harmonic generation) element and emits laser beam for forming green, and a wavelength conversion laser (B-SHG) 114B which employs a SHG element and emits laser beam for forming blue. Along the directions of travel of the laser beams 115R, 115G and 115B emitted from the lasers 114R, 114G and 114B, there are provided collimator lenses 116R, 216G and 116B, acoustooptic modulators 118R, 118G and 118B, reflecting mirrors 120R, 120G and 120B, condenser lenses 122R, 122G and 122B, slits 124R, 124G and 124B, ND filters 126R, 126G and 126B, cylindrical lenses 128R, 128G and 128B, a polygonal mirror 130, an fθ lens 132, a cylindrical mirror 134 and a reflecting mirror 136. The laser beams 115R, 115G and 115B of the three primary colors reflected at the reflecting mirror 136 are projected onto the photosensitive material 20 conveyed in the sub-scanning direction by the sub-scanning system and defines a main scanning line SL.

The laser 114R emits a laser beam 115R of 680 nm, the laser 114G emits a laser beam 115G of 532 nm and the laser 114R emits a laser beam 115B of 473 nm. The laser beams 115R, 115G and 115B impinge upon the reflecting face 130a of the polygonal mirror 130 at angles different from each other by a small angle, e.g., 4°. The scanning optical system 110 need not be limited to such an optical system in which the three color laser beams impinge upon the polygonal mirror 130 at different angles and the laser beams are not combined with each o:her but may be any optical system so long as it can cause the laser beams of the three primary colors to scan the photosensitive material. For example, an optical system in which three laser beams emitted from three lasers are combined into a single laser beam by use of dichroic mirrors or the like and caused to impinge upon the polygonal mirror may be employed as the scanning optical system. The light sources may be of any type so long as the combination of light sources can expose a photosensitive material having wavelength-dependent spectral sensitivities. For example, the light sources may be a semiconductor laser such a laser diode, or a gas laser such as a He—Ne laser. The light sources may be selected according to the spectral sensitivities of the photosensitive material. Preferably the light sources are those which emit light beams having a narrow wavelength band in the visible light range.

The collimator lenses 116R, 116G and 116B shape the laser beams 115R, 115G and 115B emitted from the lasers 114R, 114G and 114B to form beam waists respectively in the acoustooptic modulators 118R, 118G and 118B. The acoustooptic modulators 118R, 118G and 118B are for modulating the laser beams 115R, 115G and 115B according to the processed image signals of the respective colors. In the present invention, the laser beams may be modulated in any method. For example, various optical modulators may be used in place of the acoustooptic modulator. Depending on the type of the laser, the laser itself may be directly modulated. The direct modulation may be any one of intensity modulation, pulse number modulation and pulse width modulation.

The reflecting mirrors 120R, 120G and 120B are for changing the optical paths of the respective laser beams 115R, 115G and 115B so that the laser beams impinge upon a reflecting face 130a of the polygonal mirror 130 at points on a line on the reflecting face 130a as near to each as possible. The condenser lenses 122R, 122G and 122B adjust the beam diameters of the laser beams in the main scanning direction and the cylindrical lenses 128R, 128G and 128B adjust the beam diameters of the laser beams in the sub-scanning direction. Further the cylindrical lenses 128R, 128G and 128B, the fθ lens 132 and the cylindrical mirror 134 form a surface tilt compensating optical system which compensates for surface tilt of the polygonal mirror 130. The slits 124R, 124G and 124B adjust the beam diameters and the ND filters 126R, 126G and 126B are for controlling the amounts of light.

The polygonal mirror 130 deflects the modulated laser beams 115R, 115G and 115B to cause the laser beams to scan the photosensitive material in the main scanning direction. The lasers 114R, 114G and 114B are arranged so that the laser beams 115R, 115G and 115B emitted therefrom impinge upon one reflecting face 130a of the polygonal mirror 130 at angles slightly different from each other and then impinge upon the photosensitive material 20 at different angles on one main scanning line SL, thereby scanning the photosensitive material 20 along the same scanning line SL one after another at intervals. Further as shown in FIG. 5, the polygonal mirror 130 is rotated in the closed-type housing 140 to deflect the laser beams 115R. 115G and 115B. Wind generated by rotation of the polygonal mirror 130, dust blown by the wind and/or dust adhering to the optical elements in the housing 140 can affect the laser beams and adversely affect the image reproduced. In order to overcome such a problem, the polygonal mirror 130 may be enclosed in a transparent cover 131 made of, for instance, glass.

The fθ lens 132 is for correctly focusing the laser beams 115R, 115G and 115B in any position on the main scanning line. The fθ lens 132 has been corrected so that the color aberration for any one of 473 nm, 532 nm and 680 nm is within an acceptable range. The cylindrical mirror 134 forms a surface tilt compensating optical system which compensates for surface tilt of the polygonal mirror 130 together with the cylindrical lenses 128R, 128G and 128B and the fθ lens 132 and at the same time changes the optical paths of the laser beams 115R, 115G and 115B to impinge upon the reflecting mirror 136. The reflecting mirror 136 reflects the laser beams to scan the photosensitive material 20 along the main scanning line SL substantially normal to the direction in which the photosensitive material 20 is conveyed by the sub-scanning system 150 (sub-scanning direction).

A start-of-scan sensor 138 is disposed near the cylindrical lens 128R to detect start of each scanning line and a start-of-scan reflecting mirror 139 is provided on the inner surface of the housing 140 near a beam exit window 144 to be described later. The start-of-scan reflecting mirror 139 reflects toward the start-of-scan sensor 138 at least one of the laser beams 115R, 115G and 115B after passing through the fθ lens 132 at its starting end.

A part of a plurality of optical elements forming the optical system of the main scanning section 112, that is, the reflecting mirrors 120R, 120G and 120B, condenser lenses 122R, 122G and 122B, slits 124R, 124G and 124B, ND filters 126R, 126G and 126B, cylindrical lenses 128R, 128G and 128B, polygonal mirror 130, fθ lens 132, cylindrical mirror 134 and reflecting mirror 136 described above, are contained in the closed-type housing 140 and are fixed to the bottom of the housing 140 in the respective predetermined positions. The housing 140 has a desired volume and shape and a part of the housing 140, e.g., a lid portion, may be removable. The lasers 114R, 114G and 114B, the collimator lenses 116R, 116G and 116B and the acoustooptic modulators 118R, 118G and 118B are disposed outside the housing 140.

The laser beams 115R, 115G and 115B which have been modulated by the acoustooptic modulators 118R, 118G and 118B outside the housing 140 and travel toward the reflecting mirrors 120R, 120G and 120B inside the housing enters the housing respectively through beam entrance windows 142R, 142G and 142B formed in the housing 140. The laser beams 115R, 115G and 115B reflected by the reflecting mirror 136 inside the housing toward the sub-scanning section 150 outside the housing 140 travel outside the housing 140 through the beam exit window 144 formed in the housing 140. The housing 140 is formed of a light-shielding material, e.g., metal such as aluminum, synthetic resin or the like, in order to isolate the space therein from the outside atmosphere to remove influence of external light, dust or the like and may be formed by a known method such as forging, pressing, injection molding or the like. The optical elements described above may be directly fixed to the base plate formed by the bottom of the housing 140 by known means such as grooves, projections, pins, spring plates and the like or may be fixed to the base plate by way of optical element mounting members on or to which the optical elements are supported or fixed and which are fixed to the base plate by fasteners such as screws.

As shown in FIG. 6, the sub-scanning section 150 comprises an exposure drum 152 which can be rotated both in regular and reverse directions, and a pair of driven nip rollers 154 and 156 which are disposed on opposite sides of the main scanning line SL on the photosensitive material 20 and press the photosensitive material 20 against the exposure drum 152. At least during scanning of one frame, the exposure drum 152 is rotated in the regular direction and the photosensitive material 20 in a continuous length is conveyed in the sub-scanning direction held in the predetermined exposure position by the exposure drum 152 and the nip rollers 154 and 156. In order to save the photosensitive material 20, it is preferred that the spaces between the frames be as small as possible. For example, the spaces are preferably about 3 mm and more preferably about 2 mm, if possible. However, if the spaces are so small, it is difficult to stabilize the conveying speed in the space between the frames after a series of exposures (sometimes exposure of only one frame and sometimes exposures of a plurality of frames) is completed and the exposure drum 152 is once stopped. Accordingly, in this embodiment, after completion of a series of exposures, the exposure drum 152 is reversed and the photosensitive material 20 is conveyed in the reverse direction by a predetermined distance and then caused to wait there. When preparations for another series of exposures are made, the exposure drum 152 is rotated again in the regular direction to convey the sub-scanning direction. The laser beams 115R, 115G and 115B are kept emitted from the lasers 114R, 114G and 114B even when the photosensitive material 20 should not be exposed to the laser beams, that is, when a space between the frames is in the exposure position, during the interval between one series of exposures and another series of exposures, until the reverse conveyance of the photosensitive material 20 is stopped, and from the time conveyance of the photosensitive material 20 in the regular direction is resumed to the time and the next frame area is brought to the exposure position.

Accordingly, in order to prevent the laser beams 115R, 115G and 115B from impinging upon the photosensitive material 20 when the photosensitive material 20 should not be exposed, a shutter means for closing the beam entrance windows 142R, 142G and 142B and/or the beam exit window 144 when the photosensitive material 20 should not be exposed is provided. Otherwise the window itself may be a shutter. A mechanical shutter, for instance, one disclosed in Japanese Patent Application No. 7(1995)-328633 may be used as the shutter.

In this embodiment, mechanical shutters 146R, 146G and 146B are provided on the beam entrance windows 142R, 142G and 142B. Each shutter comprises a disk-like shutter member having a cutaway portion and a driver which rotates the shutter member. The driver selectively moves the shutter member between a closing position where the shutter member cuts the laser beam and an opening position where the shutter member permits the laser beam to pass through.

The drivers of the shutters 146R, 146G and 146B selectively rotate the shutter members to their opening positions or their closing positions under the control of a control circuit. The shutter members are rotated to the closing positions when the photosensitive material 20 should not be exposed to the laser beams, that is, when a space between the frames is in the exposure position, during the interval between one series of exposures and another series of exposures, and from the time the reverse conveyance of the photosensitive material 20 is initiated to the time conveyance of the photosensitive material 20 in the regular direction is resumed and the next frame area is brought to the exposure position.

When conveyance of the photosensitive material 20 in the regular direction is resumed and the leading end of the exposure region of a new frame is brought to the exposure position, the shutter members are rotated to the opening positions.

In the scanning optical system 110, specifically the scanning width is 210 mm, the picture element density in the main scanning direction is 300 dpi, the picture element density in the sub-scanning direction is 600 dpi and the beam diameter is 65 µm ($1/e^2$) in both the main and sub-scanning directions.

The photosensitive material employed in the embodiment described above will be described hereinbelow.

The color photosensitive material can be formed by coating one or more yellow forming silver halide emulsion layers, one or more magenta forming silver halide emulsion layers, and one or more cyan forming silver halide emulsion layers on a support. In a color photographic paper for general-purpose, by incorporating, in the silver halide emulsion layer, a color coupler which forms a dye complementary to the color of the light to which the silver halide emulsion is sensitive, colors can be reproduced in the subtractive process. In the general-purpose color photographic paper, the silver halide emulsion grains in the respective layers are sensitized in the respective colors by the blue-sensitive, green-sensitive and red-sensitive sensitizing dyes in the order of the color forming layers described above. The order of the color forming layers may be as described above and may be different from the order described above. From the viewpoint of processing speed, it is sometimes preferred that the photosensitive layer containing the silver halide grains largest in mean grain size be the uppermost layer while from the viewpoint of the preservation under exposure to light, it is sometimes preferred that magenta forming photosensitive layer be the lowermost layer.

The photosensitive layers need not have the aforesaid correspondence with the colors formed therein and at least one infrared-sensitive silver halide emulsion layer can be employed.

The support may be of any material so long as a photographic emulsion layer can formed thereon. For example, paper, glass, plastic film and the like can be used. However a reflective support is most preferable.

The reflective support is a support which has a high reflectivity and makes sharper the dye images formed in the silver halide emulsion layers. The reflective support includes those formed by coating on a support a hydrophobic resin containing therein dispersed light-reflective substance such as titanium oxide, zinc oxide, calcium carbonate, calcium sulfate and the like and those in which a hydrophobic resin containing therein dispersed light-reflective substance itself is used as the support. For example, there are included polyethylene-coated paper, polyethylene terephthalate-coated paper, polypropylene synthetic paper, and a transparent paper provided with a reflective layer or reflective substance such as a glass plate; polyester films such as polyethylene terephthalate, cellulose triacetate and cellulose nitrate; polyamide film; polycarbonate film; polystyrene film; and polyvinyl chloride resin film. A reflective support comprising a paper support coated on opposite sides thereof with waterproof resin layers at least one of which contains fine particles of white pigment is preferable.

As the waterproof resin, those having water absorption of not higher than 0.5 wt %, preferably not higher than 0.1 wt %, may be used. Such waterproof resins include polyolefins such as polyethylene, polypropylene and polymers of polyethylene family; vinyl polymers and its copolymers (polystyrene, polyacrylate and their copolymers); and polyester (polyethylene terephthalate, polyethylene isophthalate and the like) and its copolymers. Polyethylene and polyester are especially preferable.

Polyethylene may be high-density polyethylene, low-density polyethylene and mixtures of these polymers. It is preferred that the MFR (melt flow rate) before processing of the polyethylene resin be in the range of 1.2 g to 12 g per ten minutes as measured under condition 4 in table 1 of JISK7210. The MFR before processing of the polyolefin resin as mentioned here means the MFR before incorporating bluing agent and white pigment.

As polyester, polyester synthesized by condensation polymerization of dicarboxylic acid and diol is preferable. As dicaroxylic acid, terephthalic acid, isophthalic acid, naphthalene dicarboxylic acid and the like are preferable. As diol, ethylene glycol, butylene glycol, neopentyl glycol, triethylene glycol, butanediol, hexylene glycol, bisphenol A ethylene oxide addition product (2,2-bis(4-(2-hydroxyethyloxy)phenyl)propane), 1,4-dihydroxymethylcyclohexane and the like are preferable.

Various polyesters synthesized by condensation polymerization of one or more of the dicarboxylic acids and one or more of the diols described above may be used. Preferably at least one of the dicarboxylic acids is terephthalic acid. As the carboxylic acid component, a mixture of terephthalic acid and isophthalic acid in the ratio of 9:1 to 2:8 and a mixture of terephthalic acid and naphthalene dicarboxylic acid in the ratio of 9:1 to 2:8 may be preferably used. As diol, ethylene glycol and mixed diol containing ethylene glycol are preferable. It is preferred that the molecular weights of these polymers be in the range of 30000 to 50000.

It is also preferable to use a mixture of plurality of kinds of polyester having different compositions. Further mixtures of these polyesters and other resins may be preferably used. Such other resins include polyolefins such as polyethylene, polypropylene and the like, polyethers such as polyethylene glycol, polyoxymethylene, polyoxy propylene and the like, polyester family polyurethane, polyether polyurethane, polycarbonate, polystyrene and the like which are extrudable at 270° to 350° C. One or more these resins may be mixed with polyester. For example, 6 wt % of polyethylene and 4 wt % of polypropylene may be mixed with 96 wt % of polyethylene terephthalate. The ratio of polyester to other resin differs depending on the kind of resin mixed with polyester. In the case of a polyolefin, a ratio of polyester to other resin in the range of 100:0 to 80:20 by weight is suitable. Exceeding this range results in rapid deterioration in physical properties of the mixed resin. In the case of resin other than polyolefin, a ratio of polyester to other resin in the range of 100:0 to 50:50 by weight is suitable.

The weight ratio of the aforesaid waterproof resin to the white pigment is between 98:2 to 30:70, preferably 95:5 to 50:50 and more preferably 90:10 to 60:40. When the white pigment content is less than 2 wt %, contribution to whiteness becomes unsatisfactory, and when the white pigment content exceeds 70 wt %, smoothness of the obtained photographic support becomes unsatisfactory and the support cannot be excellent in glass.

The waterproof resin is coated on the support preferably in a thickness of 2 to 200 μm, and more preferably in a thickness of 5 to 80 μm. When the thickness of the waterproof resin layer exceeds 200 μm, the layer becomes too brittle and cracking and the like can be generated. When the thickness of the waterproof resin layer is less than 2 μm, waterproofness deteriorates and whiteness and surface smoothness cannot be satisfied at one time. Further the support becomes too soft.

The thickness of the resin layer on the side of the support opposite to the side on which photosensitive material layer is coated is preferably 5 to 100 μm and more preferably 10 to 50 μm. When the thickness of the layer exceeds 100 μm, the layer becomes too brittle and cracking and the like can be generated. When the thickness of the resin layer is less than 5 μm, waterproofness deteriorates and the support becomes too soft.

In the reflective support, it is sometimes preferred from the viewpoint of cost and productability of the support that the photosensitive material side waterproof resin layer consists of a plurality of waterproof resin layers which are different in white pigment content. In this case, preferably the white pigment content of the layer nearest to the support is lower than that of at least one of the upper layers. More preferably the white pigment content of the layer nearest to the photosensitive material layer is the highest in the layers, or the photosensitive material side waterproof resin layer consists of at least three layers which are different in white pigment content and the white pigment contents of the layer nearest to the photosensitive material layer and one of the intermediate layers are the highest.

The white pigment content of each layer of the multi-layer waterproof resin layer is 0 to 70 wt %, preferably 0 to 50 wt %, and more preferably 0 to 40 wt %. The white pigment content of the highest content layer is 9 to 70 wt %, preferably 15 to 50 wt % and more preferably 20 to 40 wt %. When the white pigment content of the highest content layer is less than 9 wt %, sharpness of the image deteriorates and when the white pigment content of the highest content layer exceeds 70 wt %, cracking is generated in film formed by melt extrusion.

The thickness of each layer of the multi-layer waterproof resin layer is preferably 0.5 to 50 μm. For example, in the case of two-layer waterproof resin layer, it is preferred that each layer is 0.5 to 50 μm in thickness and the total thickness of the two-layer waterproof resin layer is within the aforesaid range (2 to 200 μm). In the case of three-layer waterproof resin layer, it is preferred that the uppermost layer is 0.5 to 10 μm in thickness, the intermediate layer is 5 to 50 μm in thickness, and lowermost layer (nearest to the support) is 0.5 to 10 μm in thickness. When the thickness of the uppermost layer or the lowermost layer is less than 0.5 μM, die lines are apt to be generated due to highly packed white pigment in the intermediate layer. When the thickness of the uppermost layer or the lowermost layer, especially of the uppermost layer, is more than 10 μm, sharpness deteriorates.

It is preferred that fine particles of the white pigment be uniformly dispersed in the reflecting layer without forming aggregate. The distribution of the particles can be obtained by measuring the percentage (Ri) of the area occupied by the white pigment particles in a unit projected area. The coefficient of variation of the percentage of the occupied area is obtained as the ratio s/R of the standard deviation s of Ri to the average R of Ri. In the photosensitive material employed here, the coefficient of variation of the percentage of the occupied area should be not larger than 0.15, preferably not larger than 0.12 and more preferably not larger than 0.08.

It is preferred that the support is provided with a surface exhibiting type II diffuse reflection. The type II diffused reflection is diffused reflection obtained by a surface which is formed by imparting irregularities to a mirror surface to divide the mirror surface into numerous fine mirror surfaces facing in dispersed directions. The irregularities in the surface exhibiting type II diffused reflection are 0.1 to 2 μm, preferably 0.1 to 1.2 μm in three-dimensional mean roughness to the central surface. The frequency of the irregularities is 0.1 to 2000 cycles/mm and preferably 50 to 600 cycles/mm for irregularities not smaller than 0.1 μm in roughness. Such a support is described in detail in Japanese Unexamined Patent Publication No. 2(1990)-239244.

In the photosensitive material, preferably the silver halide is silver chloride, silver chloro bromide or silver bromiodide at least 95 mole percents of which is silver chloride. In order to increase the developing speed, it is preferred that silver chloride or silver chloro bromide containing substantially no silver iodide, i.e., containing silver iodide in not more than 1 mole percent and preferably not more than 0.2 mole percent. In order to improve sensitivity to high intensity light, spectral sensitization and/or stability to aging of the photosensitive material, high silver chloride grains containing 0.01 to 3 mole % silver iodide is sometimes preferred in the surface area of the emulsion as disclosed in Japanese Unexamined Patent Publication No. 3(1991)-84545. The grains in the emulsion may be different from each other in the halogen composition or may be the same in the halogen composition. However when the grains in the emulsion are the same in the halogen composition, the properties of the grains can be easily made uniform. As for the halogen composition distribution inside the silver halide emulsion grains, the grains may be of a homogeneous structure in which the composition is the same in any portion of the grain, or of a laminated structure in which the halogen composition in the core portion differs from that in the shell portion (in one or more layers), or of a structure in which the grains have a portion of different halogen composition inside of the grain or on the surface thereof in a non-layered fashion (in the case where a portion of different halogen composition exists on the surface of the grain, a structure in which the different composition portion is bonded to a corner or the surface of the grain). In order to high speed, employing one of the latter two structures is advantageous. Further the latter two structures are advantageous also from the viewpoint of pressure resistance. In the case of the latter two structures, the boundary of the different composition portion may be a clear boundary or an unclear boundary where mixed crystals are formed due to the composition difference. Further the boundary may be positively given a continuously varying structure.

It is preferred that the high silver chloride emulsion has a structure where a localized silver bromide phase exists inside the silver halide grains and/or on the surface thereof in a layered fashion or a non-layered fashion described above. Preferably the localized phase contains therein at least 10 mole % of silver bromide and more preferably more than 20 mole % of silver bromide. The silver bromide content of the localized silver bromide phase can be analyzed, for instance, by X-ray diffractometry (see, for instance, "Lectures on New Experimental Chemistry 6, Structural Analysis" edited by Japanese Chemical Society, Maruzen). The localized phase may be inside the grain, on the edge surface of the grain or on the surface of the grain. A localized phase in the form of an epitaxial layer on a corner of the grain is a preferable example.

For the purpose of reduction in replenishment of developing solution, it is effective to further increase the silver chloride content of the silver halide emulsion. In such a case, an emulsion of substantially pure silver chloride whose silver chloride content is as high as 98 to 100 mole % may be preferably employed.

The mean size of the silver halide grains contained in the silver halide emulsion (the average of the sizes of grains with the diameter of a circle equivalent to the projected area of a grain taken as the size of the grain) is preferably 0.1 to 2 μm.

The grain size distribution should have a coefficient of variation (obtained by dividing the standard deviation of the grain size distribution by the mean grain size) not larger than 20%, preferably not larger than 15% and more preferably not smaller than 10% (a so-called monodisperse system). In order to obtain a wide latitude, the monodisperse emulsions may be blended in one layer or may be coated in a plurality of layers.

The shape of the silver halide grains contained in photographic emulsion may be those having a regular crystal form such as cube, octahedron or the like, or those having irregular crystal form such as sphere, plate or the like, or those having a combination of these shapes. Further the grains may comprise a mixture of the grains having different crystal forms. The photographic emulsion should include not less than 50%, preferably not less than 70% and more preferably not less than 90% of grains of a regular crystal form. Further an emulsion in which the plate-like grains whose mean aspect ratio (the diameter of a circle equivalent to the projected area of a grain/thickness of the grain) is not smaller than 5, preferably not smaller than 8, exceeds 50% of the whole grains in the projected area may also be preferred.

The silver chloride (bromide) emulsion employed in the photosensitive material may be prepared by any one of the methods such as those disclosed in "Chimie et Phisique Photographique" (by P. Glakfides, published by Paul Montel, 1967), "Photographic Emulsion Chemistry" (by G. F. Duffin, published by Focal Press, 1966), "Making and Coating Photographic Emulsion" (V. L. Zelikman et al., published by Focal Press, 1964) and the like. That is, any of the acidic method, neutral method and ammonia method may be employed. Further soluble silver salt and soluble halogen salt may be reacted with each other by any of the one-side mixing method, the simultaneous mixing method and a combination of these methods. Further a method in which grains are formed in a silver ion excess atmosphere (a so-called back mixing) may be employed. One of the simultaneous mixing methods, a so-called double jet method in which pAg in the liquid phase in which sliver halide is generated is kept constant may be used. By this method, there can be obtained a silver halide emulsion in which the crystal forms of the grains are regular and the grain sizes are substantially uniform.

It is preferred that localized phase of silver halide grains or the substrate thereof contains metal ions of a different kind or complex ions thereof. Metals of VIII family and IIb family in a periodic table or their complexes, lead ions, thallium ions are preferred. Ions of one or more metals selected from the group consisting of iridium, rhodium, iron and the like and their complex ions may be used mainly for the localized phase, and ions of one or more metals selected from the group consisting of osmium, iridium, rhodium, platinum, ruthenium, palladium, cobalt, nickel, iron and the like and their complex ion may be used mainly for the substrate. The kind of the metal ion and its density in the localized phase may differ from those in the substrate. Especially iron compound and/or iridium compound are preferred to be contained in the silver bromide localized phase.

These metal ion presenting compounds may be incorporated in the silver halide grain localized phase and/or the substrate, for instance, by adding to an aqueous gelatin solution, an aqueous halide solution, an aqueous silver salt solution or other aqueous solution when forming silver halide grains, or by adding in the form of fine grains of silver halide and dissolving the fine grains.

The metal ions employed in the photosensitive material may be incorporated in the emulsion grains before, during or just after formation of the grains depending upon in what part of the grains the metal ions are incorporated.

The silver halide emulsion are normally chemically or optically sensitized.

As the chemical sensitizing method, a chemical sensitization using chalcogen sensitizing agents (specifically, sulphur sensitization represented by addition of instable sulphur compound, selenium sensitization by selenium compound, or tellurium sensitization by tellurium), precious metal sensitization represented by gold sensitization, reduction sensitization or combination of these sensitization may be employed. As the compounds for the chemical sensitization, those described in Japanese Unexamined Patent Publication No. 62(1987)-215272 (page 18, lower right column–page 22, upper right column) may be preferably used.

The photographic emulsion employed in the photosensitive material is a surface latent image type emulsion which forms a latent image predominantly on the surface of the grains.

Various compounds or their precursors may be added to the silver halide emulsion in order to prevent fogging during the manufacturing step of the photosensitive material, storage thereof or development or to stabilize photographic performances. As these compounds, those described in Japanese Unexamined Patent Publication No. 62(1987)-215272 (page 39–page 72) may be preferably used. Further, 5-arylamino-1,2,3,4-thiatriazole compounds (residual aryl group having at least one electron attractive group) described in EP 0,447,647.

Spectral sensitization is carried out for the purpose of sensitizing the emulsions in the respective layers to respective desired wavelengths.

As spectral sensitizing dyes for sensitization to light of blue, green and red ranges, for instance, those described in "Heterocyclic compounds-Cyanine dyes and related compounds" (by P. M. Harmer, published by John Wiley & Sons (New York, London), 1964) may be used. As specific compounds and methods of sensitization, those described in Japanese Unexamined Patent Publication No. 62(1987)-215272 (page 22, upper right column–page 38) may be preferably used. As red sensitizing dyes for silver halide emulsion grains having especially large silver chloride content, spectral sensitizing dyes disclosed in Japanese Unexamined Patent Publication No. 3(1991)-123340 are especially preferable from the viewpoint of stability, adsorbing power and temperature-depending characteristics of exposure.

When effectively sensitizing the silver halide emulsion to infrared region, sensitizing dyes described in Japanese Unexamined Patent Publication Nos. 3(1991)-15049 (page 12, upper left column–page 21, lower left column), Japanese Unexamined Patent Publication Nos. 3(1991)-207300 (page 4, lower left column–page 15, lower left column), EP 0,420,011 (page 4, line 21–page 6, line 54) EP 0,420,012 (page 4, line 12–page 10, line 33), EP 0,443,466, and U.S. Pat. No. 4,975,362 are preferably used.

These spectral sensitizing dyes may be incorporated in the silver halide emulsion by directly dispersing them in the emulsion or by dissolving them in solvent such as water, methanol, ethanol, propanol, methyl cellosolve (2-methylethanol)-2,2,3,3-tetrafluoropropanol or a mixture of these solvents and adding to the emulsion. Further an aqueous solution of the sensitizing dyes with base or acid may be added to the emulsion as disclosed in Japanese Patent Publication Nos. 44(1969)-23389, 44(1969)-27555 and 57(1982)-22089, or an aqueous solution or a colloidal dispersion of the sensitizing dye containing surfactant may be added to the emulsion as disclosed in U.S. Pat. Nos. 3,822,135 and 4,006,025. Further the spectral sensitizing dyes may be dissolved in solvent which is substantially immiscible such as phenoxyethanol and dispersed through water or hydrophilic colloid and added to the emulsion. Otherwise the sensitizing dyes may be directly dispersed in hydrophilic colloid and then added to the emulsion. The sensitizing dyes may be added to the emulsion at any time which has been known as useful, e.g., before formation of silver halide emulsion grains, during formation of silver halide emulsion grains, between just after formation of silver halide emulsion grains and washing step, before chemical sensitization, between just after chemical sensitization and the time the emulsion is cooled and solidified or during preparation of coating solution. Though the spectral sensitizing dye is normally added to the emulsion between completion of the chemical sensitization and coating, the spectral sensitizing dye may be added to the emulsion simultaneously with the chemical sensitizing agent to carrying out the spectral sensitization simultaneously with the chemical sensitization as disclosed in U.S. Pat. Nos. 3,628,969 and 4,225,666, or may be added prior to the chemical sensitization as disclosed in Japanese Unexamined Patent Publication No. 58(1983)-113928. Further the spectral sensitizing dye may be added before completion of precipitation of silver halide grains to initiate spectral sensitization. Further it is possible to add part of the spectral sensitizing dye prior to chemical sensitization and the rest after the chemical sensitization as suggested in U.S. Pat. No. 4,225,666. Further the spectral sensitizing dye may be added at any stage of formation of the silver halide grains as disclosed in U.S. Pat. No. 4,183,756. However it is preferred that the spectral sensitizing dye be added before washing the emulsion or before the chemical sensitization.

Though the amount of spectral sensitizing dye to be added widely ranges depending on conditions, the range of $0.5 \times 10^{-6}$ to $1.0 \times 10^{-2}$ moles per 1 mole of silver halide is preferred and the range of $1.0 \times 10^{-6}$ to $5.0 \times 10^{-3}$ moles per 1 mole of silver halide is more preferred.

When a spectral sensitizing dye having spectral sensitivity to red region to infrared region is used, it is preferred that compounds numerated in Japanese Unexamined Patent Publication No. 2(1990)-157749 (page 13, lower right column–to page, lower right column) be used together with the sensitizing dye. By use of such compounds, preservation, stability in processing and spectral sensitizing effect can be specifically improved. Among those, it is especially preferred to use the compounds represented by general formulae (IV), (V) and (VI) in the patent publication. These compounds are used in an amount of $0.5 \times 10^{-5}$ to $5.0 \times 10^{-2}$ and preferably $5.0 \times 10^{-5}$ to $5.0 \times 10^{-3}$ moles per 1 mole of silver halide. These compounds are advantageous when used in an amount 0.1 to 10000 times the moles of sensitizing dye and preferably in an amount 0.5 to 5000 times the moles of sensitizing dye.

It is preferred that the hydrophilic colloid layer be added with dyes which can be decolored by a suitable processing and are numerated in EP 0,337,490A2 (pp. 27 to 76) for the purpose of preventing irradiation and/or halation and improving safelight safety. Among those, oxonol dye and cyanine dye are preferable.

In these water-soluble dyes, there are those which can deteriorate color resolution and/or safelight safety when used in a large amount. As dyes which can be used without deterioration in color resolution, water-soluble dyes numerated in EP 0,539,978A1, and Japanese Unexamined Patent Publication Nos. 5(1993)-127325 and 5(1993)-127324 are preferable.

In the photosensitive material, a colored layer which can be decolored by a suitable processing is employed in place of the water-soluble dyes or together with the water-soluble dyes. Such a colored layer may be in direct contact with the photographic emulsion layer or in contact with the photographic emulsion layer with an intermediate layer, containing an agent for preventing mixing of colors during processing, intervening therebetween. It is preferred that the colored layer be positioned on the underside (on the support side) of the emulsion layer which is colored into a primary color of the same kind as the color of the colored layer. Such a colored layer may be provided for each of the primary colors or may be selectively provided for one or two of the primary colors. Further a colored layer colored to conform to a plurality of primary color regions may be used. The optical reflection density of the colored layer is such that it is preferably in the range of 0.2 to 3.0, more preferably in the range of 0.5 to 2.5 and most preferably in the range of 0.8 to 2.0 at a wavelength at which the optical density is maximized in a wavelength range used in exposure.

The colored layer may be formed by known methods. For example, the colored layer may be formed by incorporating dyes numerated in Japanese Unexamined Patent Publication Nos. 2(1990)-282244 (page 3, upper right column–page 8) and 3(1991)-7931 in a hydrophilic colloid layer in the form of a dispersion of solid fine particles, by mordanting cation polymer in anionic dyestuff, by causing the fine grains of silver halide and the like to adsorb dyestuff, thereby fixing the dyestuff in the layer, or by using colloidal silver described in Japanese Unexamined Patent Publication No. 1(1989)-239544. Fine particles of dyestuff can be dispersed in a solid state by incorporating fine particles of dye which is substantially insoluble in water when pH is not higher than 6 but is substantially soluble in water when pH is not lower than 8 as disclosed in Japanese Unexamined Patent Publication No. 2(1990)-308244 (pp. 4 to 13). Mordanting cation polymer in anionic dyestuff is described, for instance in Japanese Unexamined Patent Publication No. 2(1990)-84637 (pp. 18 to 26). Preparation of colloidal silver as a light absorbing agent is disclosed in U.S. Pat. Nos. 2,688,601 and 3,459,563. Among the methods of forming the colored layer, the method involving incorporation of fine particles of dye and the method involving use of colloidal silver are preferred.

In the photosensitive material, though it is advantageous to use gelatin as a binder or protective colloid, other hydrophilic colloid may be used alone or together with gelatin. As gelatin, low calcium gelatin whose calcium content is not larger than 800 ppm, preferably not larger than 200 ppm, is preferred. It is preferred that a mildewproofing agent such as described in Japanese Unexamined Patent Publication No. 63(1985)-271247 be added in order to prevent growth of mildew or bacteria in the hydrophilic colloid, which can deteriorate quality of images.

Though an exposed photosensitive material may be developed by a conventional method, it is preferred that the developed photosensitive material be subjected to bleaching-fixing process for the purpose of a high-speed processing. Especially when a high silver chloride emulsion is employed, the bleaching-fixing solution should be at a pH preferably not higher than about 6.5 and more preferably not higher than about 6 in order to promote desilverization.

As the silver halide emulsion, other materials (such as additives) and arrangement of the layers employed in the photosensitive material, the method of processing the photosensitive material and the additives employed in processing the photosensitive material, those described in Japanese Unexamined Patent Publication Nos. 62(1987)-215272 and 2(1990)-33144 and EP 0,355,660A2 (Japanese Unexamined Patent Publication No. 2(1990)-139544) as shown in the following table 1 are preferably employed. In the table, right column and left column are abbreviated respectively as "r.c." and "l.c.".

TABLE 1

| elements | 62(1987)-215272 | 2(1990)-33144 | EP 0,355,660A2 |
|---|---|---|---|
| silver halide emulsion | p 10, upper r.c., line 6 – p 12, lower l.c., line 5 & p 12, lower l.c., line 5 from bottom – p 13, upper l.c., line 17 | p 28, upper r.c., line 16 – p 29, lower r.c., line 11 & p 30, lines 2 to 5 | p 45, line 53 – p 47, line 3 & p 47, lines 20 to 22 |
| silver halide solvent | p 12, lower l.c., lines 6 to 14 & p 13, upper l.c., line 3 from bottom – p 18, lower l.c., last line | | |
| chemical sensitizer | p 12, lower l.c., line 3 from bottom – lower r.c., line 5 from bottom & p. 18, lower r.c., line 1 – upper r.c., line 9 from bottom | p 29, lower r.c., line 12 – last line | p 47, lines 4 to 9 |
| spectral sensitizer (method) | p 22, upper r.c., line 8 from bottom – page 38, last line | p 30, upper l.c., lines 1 to 13 | p 47, lines 10 to 15 |
| emulsion stabilizer | p 39, upper l.c., line 1 – p 72, upper r.c., last line | p 30, upper l.c., line 14 – upper r.c., line 1 | p 47, lines 16 to 19 |
| development promoter | p 72, lower l.c., line 1 – p 91, upper r.c., line 3 | | |
| color coupler (cyan, | p 91, upper r.c., line | p 3, upper r.c., line | p 4, lines 15 to 27 & |

TABLE 1-continued

| elements | 62(1987)-215272 | 2(1990)-33144 | EP 0,355,660A2 |
| --- | --- | --- | --- |
| magenta, yellow) | 4 ~ p 121, upper l.c., line 6 | 14 ~ p 18, upper l.c., last line & p 30, upper r.c., line 6 ~ p 35, lower r.c., line 11 | p 5, line 30 ~ p 28, last line & p 45, lines 29 to 31 & p 47, line 23 ~ p 63, line 50 |
| color forming booster | p 121, upper l.c., line 7 ~ p 125, upper r.c., line 1 | | |
| ultraviolet absorber | p 125, upper r.c., line 2 ~ p 127, lower l.c., last line | p 37, lower r.c., line 14 ~ p 38, upper l.c., line 11 | p 65, lines 22 to 31 |
| color fading inhibitor (stabilizer) | p 127, lower r.c., line 1 ~ p 37, upper l.c., line 8 | p 36, upper r.c., line 12 ~ p 37, upper l.c., line 19 | p 4, line 30 ~ p 5, line 23 & p 29, line 1 ~ p 45, line 25 & p 45, lines 33 to 40 & p 65, lines 2 to 21 |
| organic high- and/or low-boiler | p 137, lower l.c., line 9 ~ p 144, upper r.c., last line | p 35, lower r.c., line 14 ~ p 36, upper l.c., line 4 from bottom | p 64, lines 1 to 51 |
| method of dispersing additives | p 144, lower l.c., line 1 ~ p 146, upper r.c., line 7 | p 27, lower r.c., line 10 ~ p28, upper l.c., last line & p 35, lower r.c., line 12 ~ p 36, upper r.c., line 7 | p 63, line 51 ~ p 64, line 56 |
| hardener | p 146, upper r.c., line 8 ~ p 155, lower l.c., line 4 | | |
| developing agent precursor | p 155, lower l.c., line 5 ~ p 155, lower r.c., line 2 | | |
| development restrainer releasing compound | p 155, lower r.c., lines 3 to 9 | | |
| support | p 155, lower r.c., line 19 ~ p 156, upper l.c., line 14 | p 38, upper r.c., line 18 ~ p 39, upper l.c., line 3 | p 66, line 29 ~ p 67, line 13 |
| layer arrangement | p 156, upper l.c., line 15 ~ p 156, lower r.c., line 14 | p 28, upper r.c., lines 1 to 15 | p 45, lines 41 to 52 |
| dye | p 156, lower r.c., line 15 ~ p 184, lower r.c., last line | p 38, upper l.c., line 12 ~ upper r.c., line 7 | p 66, lines 18 to 22 |
| color mixing inhibitor | p 185, upper l.c., line 1 ~ p 188, lower r.c., line 3 | p 36, upper r.c., lines 8 to 11 | p 64, line 57 ~ p 65, line 1 |
| gradation regulator | p 188, lower r.c., lines 4 to 8 | | |
| stainproofing agent | p 188, lower r.c., line 9 ~ p 193, lower r.c., line 10 | p 37, upper l.c., last line ~ lower r.c., line 13 | p 65, line 32 ~ p 66, line 17 |
| surfactant | p 201, line 1 ~ p 210, upper r.c., last line | lower l.c., 1 ~ p24, lower r.c., last line & p 27, lower l.c., line 10 from bottom, lower r.c., line 9 | p 18, upper r.c., line |
| fluorine-containing compound (as antistatic agent, coating aid, lubricant, anti-adhesion agent) | p 210, lower l.c., line 1 ~ p 222, lower l.c., line 5 | p 25, upper l.c., line 1 ~ p 27, lower r.c., line 9 | |
| binder (hydrophilic colloid) | p 222, lower l.c., line 6 ~ p 225, upper l.c., last line | p 38, upper r.c., lines 8 to 18 | p 66, lines 23 to 28 |
| thickening agent | p 225, upper r.c., line 1 ~ p 227, upper r.c., line 2 | | |
| antistatic agent | p 227, upper r.c., line 3 ~ p 230, upper l.c., line 1 | | |
| polymeric latex | p 230, upper l.c., line 2 ~ p 239, last line | | |
| matting agent | p 240, upper l.c., line 1 ~ p 240, upper r.c., last line | | |
| photograph processing | p 3, upper r.c., line | p 39, upper l.c., line | p 67, line 14 ~ p 69, |

TABLE 1-continued

| elements | 62(1987)-215272 | 2(1990)-33144 | EP 0,355,660A2 |
| --- | --- | --- | --- |
| method (processing steps, additives) | 7 ~ p 10, upper r.c., line 5 | 4 ~ p 42, upper l.c., last line | line 28 |

*The quoted portions from Japanese Unexamined Patent Publication Nos. 62(1987)-215272 includes the content of amendment filed on March 16, 1987 and appearing at the end of the publication.

It is preferred that the cyan, magenta and yellow couplers be incorporated in loadable latex polymer (see, for instance, U.S. Pat. No. 4,203,716) under the presence (or absence) of organic high-boiler shown in table 1 and emulsified and dispersed in aqueous solution of hydrophilic colloid, or be dissolved together with polymer which is insoluble in water and soluble in organic solvents and emulsified and dispersed in aqueous solution of hydrophilic colloid.

As the polymer which is insoluble in water and soluble in organic solvents, monopolymers and copolymers described in U.S. Pat. No. 4,857,449 (seventh column to fifteenth column) and WO 88/00723 are preferred. Methacrylate family and acrylamide family polymers are more preferred from the viewpoint of stability of the color images. The latter is especially preferred.

It is preferred that color image durability improving compounds such as those described in EP 0,277,589A2 be incorporated in the photosensitive material together with the couplers, especially with pyrazoloazole type couplers, pyrrolotriazole type couplers and the aforesaid yellow couplers.

That is, it is preferable in preventing occurrence of stain or other side effects due to generation of color forming dyes by reaction of the couplers with the residual aromatic amine color forming-developing agent and/or oxidants thereof to use the compounds disclosed in the aforesaid EC patent which are chemically combined with residual aromatic amine developing agent after color forming-developing processing to generate chemically inert and substantially colorless compounds and/or the compounds disclosed in the aforesaid EC patent which are chemically combined with oxidants of residual aromatic amine color forming-developing agent after color forming-developing processing to generate chemically inert and substantially colorless compounds.

The cyan couplers which can be preferably incorporated in the photosensitive material in the present invention include, in addition to phenol couplers and naphthol couplers described in the documents shown in table 1, diphenylimidazole cyan couplers described in Japanese Unexamined Patent Publication No. 2(1990)-33144, 3-hydroxypyridine cyan couplers described in EP 0,333,185A2, active cyclic methylene cyan couplers described in Japanese Unexamined Patent Publication No. 64(1989)-32260, pyrrolopyrazole type couplers described in EP 0,456,226A1, pyrroloimidazole type cyan couplers described in EP 0,484,909, and pyrrolotriazole type cyan couplers described in EP 0,488,248 and EP 0,491,197A1. The pyrrolotriazole type cyan couplers are especially preferable.

As the magenta coupler, 5-pyrazolone family magenta couplers described in the documents shown in table 1 may be used. In the 5-pyrazolone family magenta couplers, arylthio-released 5-pyrazolone family magenta couplers are preferred from the viewpoint of color image durability and fluctuation in image quality due to processing.

In the pyrazoloazole type couplers, pyrazolotriazole couplers in which an alkyl group having two or three C atoms is directly connected to 2-, 3- or 6-carbon of the pyrazolotriazole ring described in Japanese Unexamined Patent Publication No. 61(1986)-65245, pyrazoloazole couplers containing in its molecule a sulfonamide group described in Japanese Unexamined Patent Publication No. 61(1986)-65246, pyrazoloazole couplers having a alkoxyphenylsulfonamide ballast group described in Japanese Unexamined Patent Publication No. 61(1986)-147254, and pyrazoloazole couplers having an alkoxy group or an aryloxy group on 6-carbon described in EP 226,849A and EP 294,785A are preferred.

As the yellow coupler, known acylacetanilide type couplers may be preferably used. Among those, acetanilide type couplers having halogen atoms or alkoxy groups on the ortho-sites of the anilide ring, pivaloyacetanilide type couplers whose acyl group is cycloalkanecarbonyl group substituted on 1-carbons described in EP 0,447,969A, and Japanese Unexamined Patent Publication Nos. 5(1993)-107701 and 5(1993)-113642, and malondianilide type couplers described in EP 0,482,552A and EP 0,524,540A are more preferable.

An example of the photosensitive material will be described, hereinbelow.

A paper support laminated with polyethylene on both sides thereof was subjected to a corona discharge treatment and a gelatin subbing layer containing sodium dodecylbenzenesulfonate was coated on the support. Further various layers were coated on the subbing layer and multilayered color photographic paper having the following layer arrangement was obtained.

The coating solutions were as follows.

Preparation of the coating solution for the first layer 122.0 g of yellow coupler (ExY), 15.4 g of color image stabilizer (Cpd-1), 7.5 g of color image stabilizer (Cpd-2) and 16.7 g of color image stabilizer (Cpd-3) were dissolved in 44 g of solvent (Solv-1) and 180 ml of ethyl acetate and the resulting solution was emulsified and dispersed in 1000 g of 10% aqueous gelatin solution containing 86 ml of 10% sodium dodecylbenzenesulfonate, thereby preparing emulsified dispersion A. Silver chloro bromide emulsion A (3:7 in mole ratio of silver) mixture of large size emulsion A containing cubic grains which were 0.88 µm in mean size and small size emulsion A containing cubic grains which were 0.70 µm in mean size) was prepared. The coefficients of variation of the grain size distribution of the large and small size emulsions A were 0.08 and 0.10 respectively. In each of the emulsions A, 0.3 mole % of silver bromide was localized on a part of the surface of silver chloride substrates. The large size emulsion A contained each $8.0 \times 10^{-5}$ moles of the following blue-sensitive sensitizing dyes A, B and C per one mole of silver and the small size emulsion A contained each $1.0 \times 10^{-4}$ moles of the blue-sensitive sensitizing dyes A, B and C per one mole of silver. The emulsified dispersion A was chemically ripened by addition of sulfur sensitizing agent and gold sensitizing agent. Then the emulsified dispersion A and the silver chloro bromide emulsion A were mixed and dissolved, and a first layer coating solution having the composition to be described later was prepared.

The amount of coating of the emulsion is shown in terms of the amount of silver.

The coating solutions for second to seventh layers were prepared in the same manner as the solution for the first layer. In each solution, 1-oxy 3,5-dichloro-s-triazine sodium salt was used as gelatin hardener.

Further Cpd-12, Cpd-13, Cpd-14 and Cpd-15 were added to each layer so that they respectively amounted to 15.0 mg/m², 60.0 mg/m², 5.0 mg/m² and 10.0 mg/m² in total.

The following spectral sensitizing dyes were used in silver chloro bromide emulsion of each photosensitive emulsion layer. Hexachloroiridium (IV) acid potassium and potassium ferrocyanide were incorporated inside the grains and in the silver bromide localized phase in each emulsion.

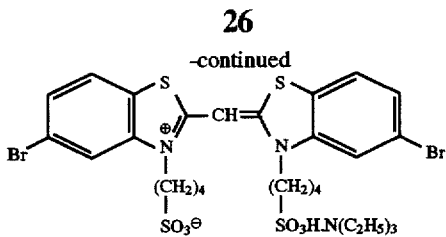

The blue-sensitive sensitizing dyes A, B and C were added to the large size emulsion each in an amount of $1.4 \times 10^{-4}$ moles per mole of silver halide and to the small size emulsion each in an amount of $1.7 \times 10^{-4}$ moles per mole of silver halide.

Green-sensitive emulsion layer sensitizing dye D
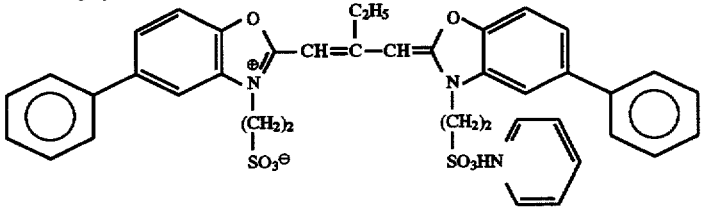

sensitizing dye E
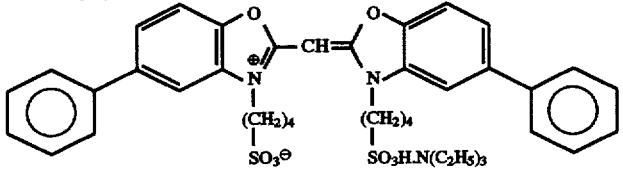

sensitizing dye F
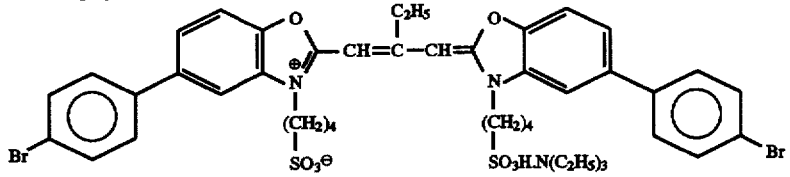

sensitizing dye A
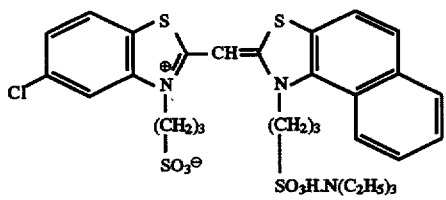

sensitizing dye B
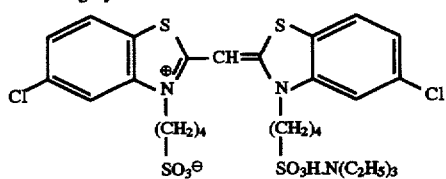

sensitizing dye C

The sensitizing dye D was added to the large size emulsion in an amount of $3.0 \times 10^{-4}$ moles per mole of silver halide and to the small size emulsion in an amount of $3.6 \times 10^{-4}$ moles per mole of silver halide. The sensitizing dye E was added to the large size emulsion in an amount of $4.0 \times 10^{-5}$ moles per mole of silver halide and to the small size emulsion in an amount of $7.0 \times 10^{-5}$ moles per mole of silver halide. The sensitizing dye F was added to the large size emulsion in an amount of $2.0 \times 10^{-4}$ moles per mole of silver halide and to the small size emulsion in an amount of $2.8 \times 10^{-4}$ moles per mole of silver halide. Red-sensitive emulsion layer sensitizing dye G sensitizing dye H

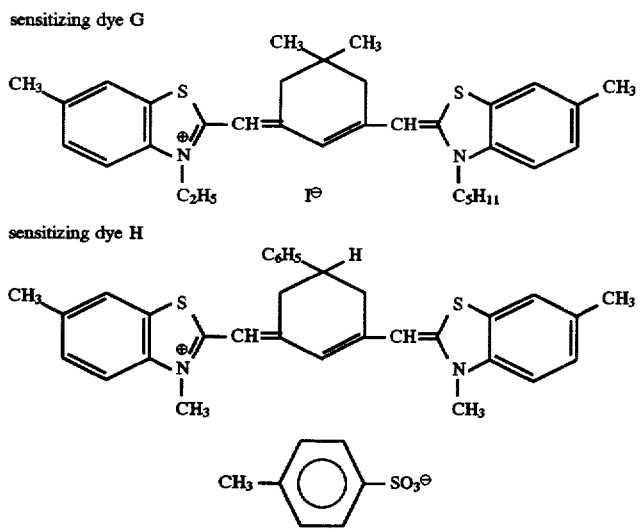

The red-sensitive sensitizing dyes G and H were added to the large size emulsion each in an amount of $5.0\times10^{-5}$ moles per mole of silver halide and to the small size emulsion each in an amount of $8.0\times10^{-5}$ moles per mole of silver halide. Further the following compound was added in an amount of $2.6\times10^{-3}$ moles per mole of silver halide.

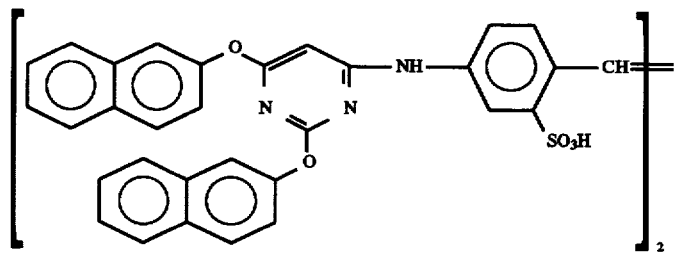

Further, 1-(5-methylureidophenyl)-5-methylmercaptotetrazole was added to the blue-, green- and red-sensitive emulsion layers respectively in amounts of $3.3\times10^{-4}$ moles, $1.0\times10^{-3}$ moles and $5.9\times10^{-4}$ moles per mole of silver halide, and to the second, fourth, sixth and seventh layers respectively in amounts of 0.2 mg/m², 0.2 mg/m², 0.6 mg/m² and 0.1 mg/m².

Further 4-hydroxy-6-methyl-1,3,3a,7-tetraazaindene was added to the blue- and green-sensitive emulsion layers respectively in amounts of $1\times10^{-4}$ moles and $2\times10^{-4}$ moles per mole of silver halide.

Further in order to prevent irradiation, the following dyes were added to the emulsion layers. (The amount of coating is shown in parentheses)

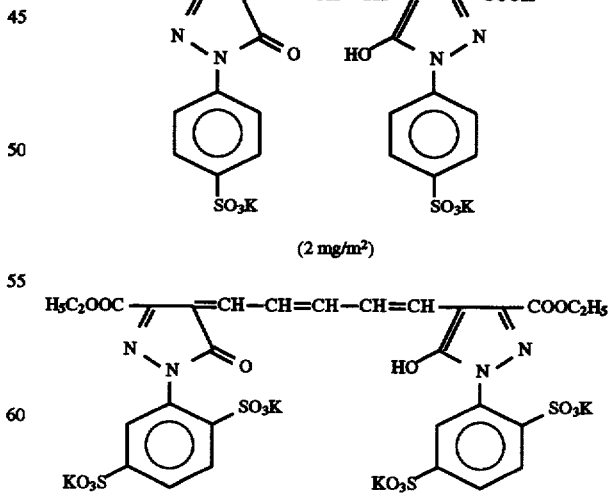

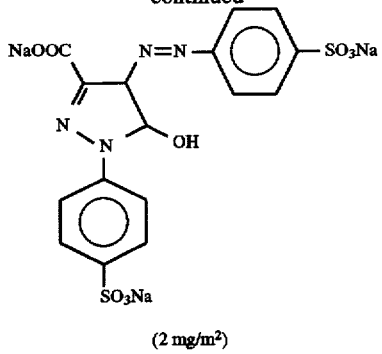

(2 mg/m²)

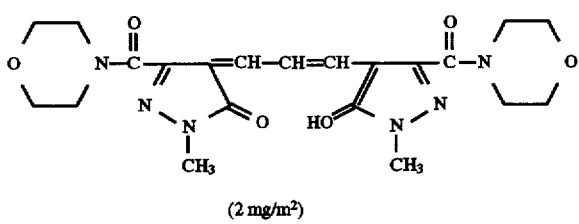

(2 mg/m²)

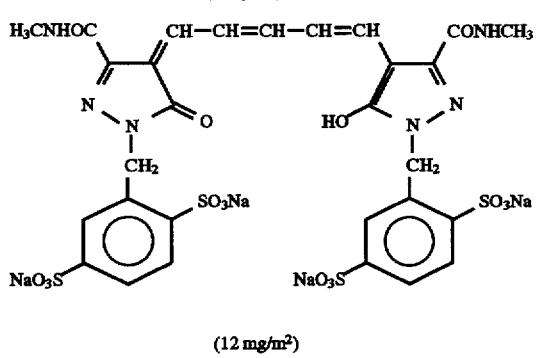

(12 mg/m²)

Arrangement of the layers

The layers were arranged as follows. Figures show the amount of coating (g/m²). The amounts of coating of silver halide emulsion are in terms of the amount of silver.

Support

Polyethylene laminated paper

The first layer side polyethylene layer contained white pigments (TiO2; 15 wt %) and bluing dye (ultramarine blue).

First layer (blue-sensitive emulsion layer)

| | |
|---|---|
| silver chloro bromide emulsion A | 0.27 |
| gelatin | 1.43 |
| yellow coupler (ExY) | 0.61 |
| color image stabilizer (Cpd-1) | 0.08 |
| color image stabilizer (Cpd-2) | 0.04 |
| color image stabilizer (Cpd-3) | 0.08 |
| solvent (Solv-1) | 0.22 |

Second layer (color mixing inhibitor layer)

| | |
|---|---|
| gelatin | 0.99 |
| color mixing inhibitor (Cpd-4) | 0.10 |
| solvent (Solv-1) | 0.07 |
| solvent (Solv-2) | 0.20 |
| solvent (Solv-3) | 0.15 |
| solvent (Solv-7) | 0.12 |

Third layer (green-sensitive emulsion layer)

| | |
|---|---|
| Silver chloro bromide emulsion (1:3 (in mole-ratio of silver) mixture of large size emulsion B containing cubic grains which were 0.55 μm in mean size and small size emulsion B containing cubic grains which were 0.39 μm in mean size. The coefficients of variation of the grain size distribution of the large and small size emulsions B were 0.10 and 0.08 respectively. In each of the emulsions B, 0.8 mol % of silver bromide was localized on a part of the surface of silver chloride substrates.) | 0.13 |
| gelatin | 1.35 |
| magenta coupler (ExM) | 0.12 |
| ultraviolet absorber (UV-1) | 0.12 |
| color image stabilizer (Cpd-2) | 0.01 |
| color image stabilizer (Cpd-5) | 0.01 |
| color image stabilizer (Cpd-6) | 0.01 |
| color image stabilizer (Cpd-7) | 0.08 |
| color image stabilizer (Cpd-8) | 0.01 |
| solvent (Solv-4) | 0.30 |
| solvent (Solv-5) | 0.15 |

Fourth layer (color mixing inhibitor layer)

| | |
|---|---|
| gelatin | 0.72 |
| color mixing inhibitor (Cpd-4) | 0.07 |
| solvent (Solv-1) | 0.05 |
| solvent (Solv-2) | 0.15 |
| solvent (Solv-3) | 0.12 |
| solvent (Solv-7) | 0.09 |

Fifth layer (red-sensitive emulsion layer)

| | |
|---|---|
| Silver chloro bromide emulsion (1:4 (in mole-ratio of silver) mixture of large size emulsion C containing cubic grains which were 0.50 μm in mean size and small size emulsion C containing cubic grains which were 0.41 μm in mean size. The coefficients of variation of the grain size distribution of the large and small size emulsions C were 0.09 and 0.11 respectively. In each of the emulsions C, 0.8 mol % of silver bromide was localized on a part of the surface of silver chloride substrates.) | 0.18 |
| gelatin | 0.80 |
| cyan coupler (ExC) | 0.28 |
| ultraviolet absorber (UV-3) | 0.19 |
| color image stabilizer (Cpd-1) | 0.24 |
| color image stabilizer (Cpd-6) | 0.01 |
| color image stabilizer (Cpd-8) | 0.01 |
| color image stabilizer (Cpd-9) | 0.04 |
| color image stabilizer (Cpd-10) | 0.01 |
| solvent (Solv-1) | 0.01 |
| solvent (Solv-6) | 0.21 |

Sixth layer (ultraviolet absorber layer)

| | |
|---|---|
| gelatin | 0.64 |
| ultraviolet absorber (UV-2) | 0.39 |
| color image stabilizer (cPD-7) | 0.05 |
| solvent (Solv-8) | 0.05 |

Seventh layer (protective layer)

| | |
|---|---|
| gelatin | 1.01 |
| acryl-modified copolymer of polyvinyl alcohol (modified by 17%) | 0.04 |
| liquid paraffin | 0.02 |
| surfactant | 0.01 |

(ExY) yellow coupler
1:1 mixture (mole-ratio) of ExY-1 and ExY-2
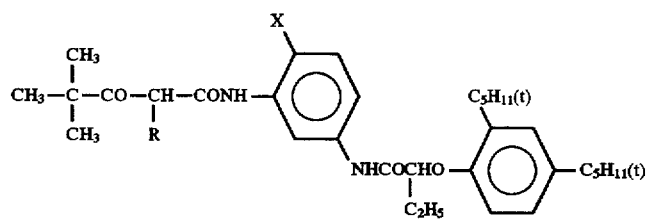
(ExY-1)
R = 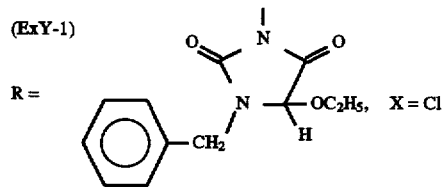, X = Cl
(ExY-2)
R = 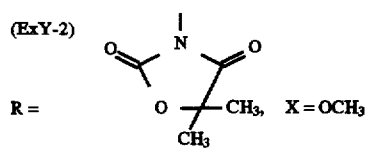, X = OCH₃
(ExM) magenta coupler
1:1 mixture (mole-ratio) of ExM-1 and ExM-2
(ExM-1)
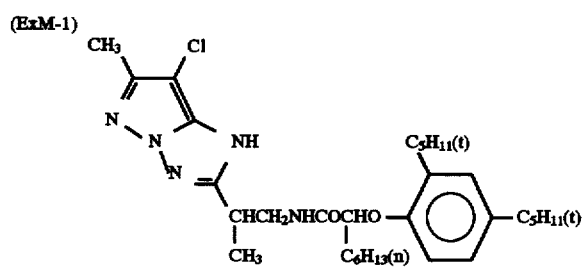
(ExM-2)
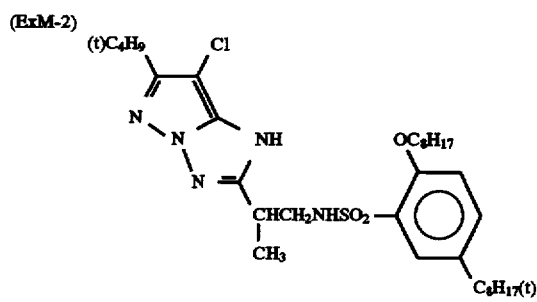
(ExC) cyan coupler
3:7 mixture (mole-ratio) of ExC-1 and ExC-2
(ExC-1)
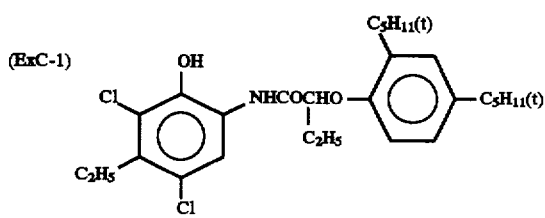

-continued
(ExC-2)
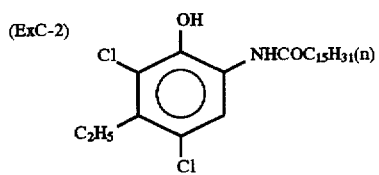
(Cpd-1) color image stabilizer
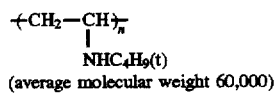
(average molecular weight 60,000)
(Cpd-2) color image stabilizer
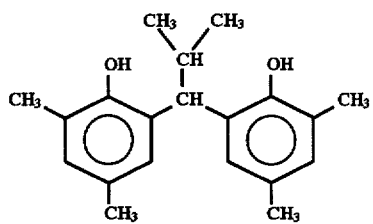
(Cpd-3) color image stabilizer
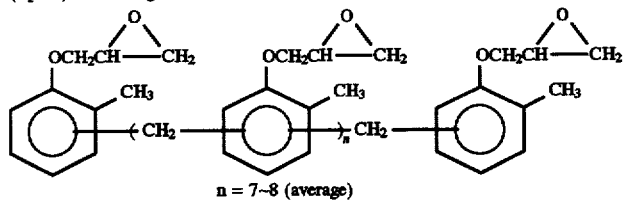
n = 7~8 (average)
(Cpd-4) color mixing inhibitor
1:1:1 mixture (by weight) of the following compounds
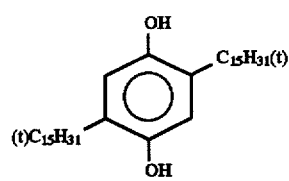 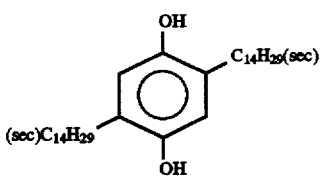 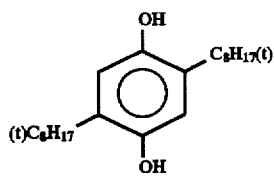
(Cpd-5) color image stabilizer
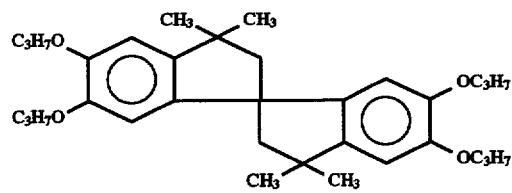
(Cpd-6) color image stabilizer
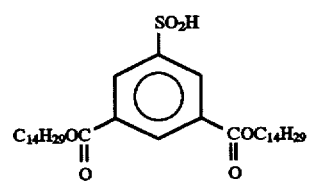
(Cpd-7) color image stabilizer -continued
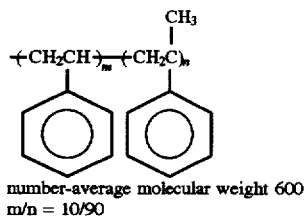
number-average molecular weight 600
m/n = 10/90
(Cpd-8) color image stabilizer
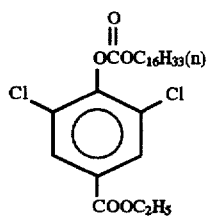
(Cpd-9) color image stabilizer
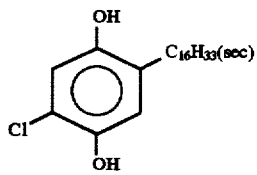
(Cpd-10) color image stabilizer
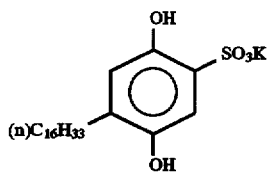
(Cpd-11) surfactant
7:3 mixture (by weight) of the following compounds
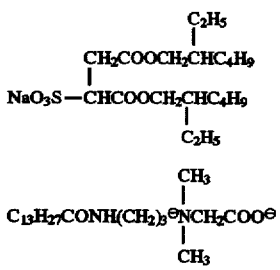
(Cpd-12) antiseptic
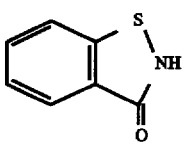
(Cpd-13) antiseptic
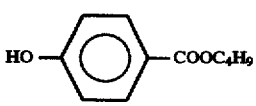
(Cpd-14) antiseptic
1:1:1:1 mixture (by weight) of a, b, c and d.

-continued
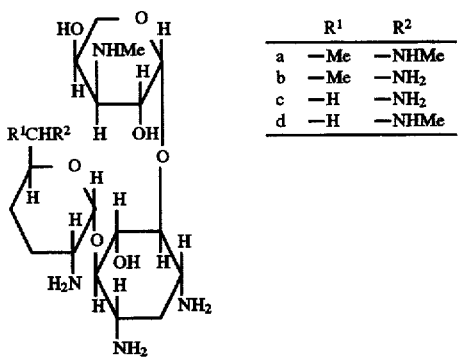
|   | R¹   | R²    |
|---|------|-------|
| a | —Me  | —NHMe |
| b | —Me  | —NH₂  |
| c | —H   | —NH₂  |
| d | —H   | —NHMe |
(Cpd-15) antiseptic
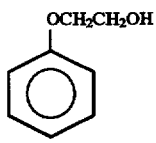
(UV-1) ultraviolet absorber
1:3:4 mixture (by weight) of (1), (2) and (3)
(1)
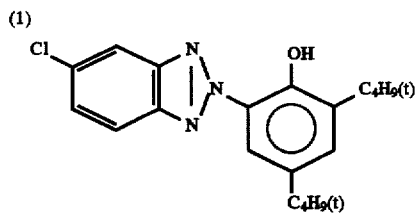
(2)
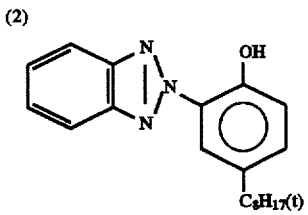
(3)
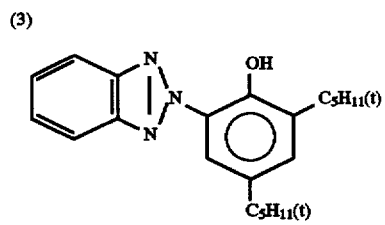
(UV-2) ultraviolet absorber
1:2:2:3:1 mixture (by weight) of (1), (2), (3), (4) and (5)
(1)
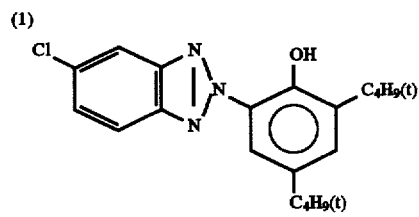
(2)
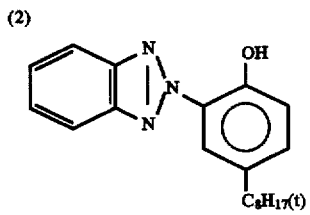
(3)
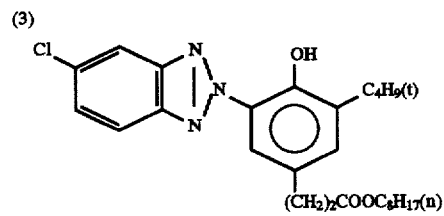
(4)
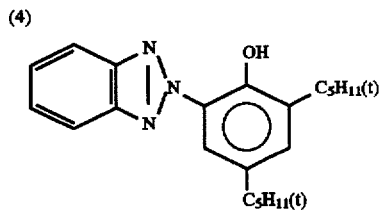

(5)
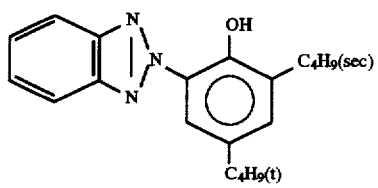
(UV-3) ultraviolet absorber
1:3:2:1 mixture (by weight) of (1), (2), (3) and (4)
(1)
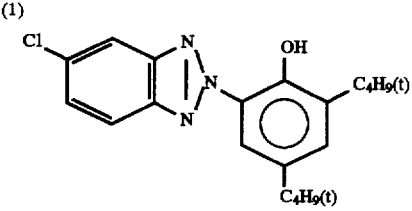
(2)
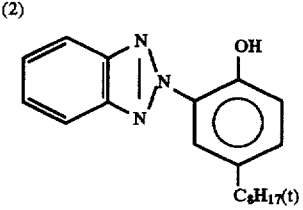
(3)
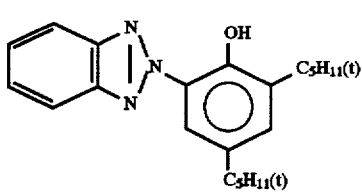
(4)
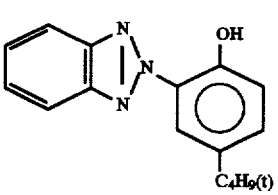
(Solv-1) solvent
(Solv-2) solvent
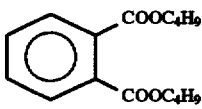
(Solv-3) solvent
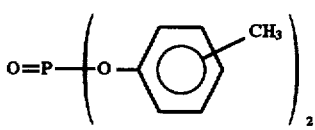
(Solv-4) solvent
(Solv-5) solvent
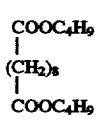
(Solv-6) solvent
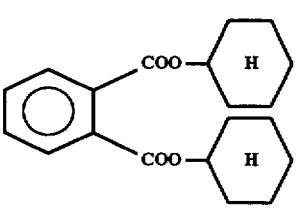

(Solv-7) solvent

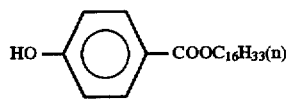

(Solv-8) solvent

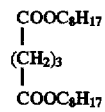

(Solv-9) solvent

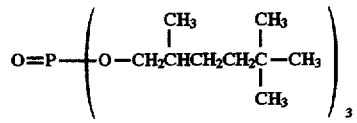

Color developer replenisher and color developing solution employed in this embodiment will be described, hereinbelow.

Known primary aromatic amine color developing agent is contained in the color developer replenisher and color developing solution. Preferable examples are p-phenylenediamine derivatives such as N,N-diethyl-p-phenylenediamine, 2-amino-5-diethylaminotoluene, 2-amino-5-(N-ethyl-N-laurylamino)toluene, 4-[N-ethyl-N-(β-hydroxyethyl)amino]aniline, 2-methyl-4-[N-ethyl-N-(β-hydroxyethyl)amino]aniline, 2-methyl-4-[N-ethyl-N-(β-hydroxybutyl)amino]aniline, 4-amino-3-methyl-N-ethyl-N-[β-mathanesulfonamido) ethyl]aniline, N-(2-amino-5-diethylaminophenylethyl)mathanesulfonamido, N,N-dimethyl-p-phenylenediamine, 4-amino-3-methyl-N-ethyl-N-methoxyethylaniline, 4-amino-3-methyl-N-β-ethoxyethylaniline, 4-amino-3-methyl-N-β-buthoxyethylaniline, and the like. 2-methyl-4-[N-ethyl-N-(β-hydroxybutyl)amino]aniline and 4-amino-3-methyl-N-ethyl-N-[β-mathanesulfonamido)ethyl]aniline are especially preferred.

The p-phenylenediamine derivatives may be salts such as sulfate, hydrochloride, sulfite and p-toluenesulfonate. The primary aromatic amine color developing agent is generally used in an amount of about 4 to 50 mM per liter of the color developing solution. In the color developer replenisher, the primary aromatic amine color developing agent is used preferably in an amount of about 20 to 100 mM per liter of the color developer replenisher and more preferably in an amount of about 28 to 75 mM per liter of the color developer replenisher.

It is preferred p-toluenesulfonic acid be used in the color-forming developing solution. The p-toluenesulfonic acid may be added as a counter salt for the color-forming developing agent or may be separately added. The amount of the p-toluenesulfonic acid added is generally 0.1 to 100 g, preferably 1 to 50 g and more preferably 3 to 30 g per liter of the color-forming developing solution.

It is preferred that the color developer replenisher and the color developing solution contain substantially no benzyl alcohol. That is, the color developer replenisher and the color developing solution should not contain benzyl alcohol in an amount larger than 2 ml/l, preferably should not contain benzyl alcohol in an amount larger than 0.5 ml/l, and most preferably should contain no benzyl alcohol.

Further it is preferred that the color developer replenisher and the color developing solution contain substantially neither sulfite nor hydroxylamine. That is, the color developer replenisher and the color developing solution should not contain either sulfite nor hydroxylamine.in an amount larger than 4 mM/l, preferably should not contain either sulfite nor hydroxylamine.in an amount larger than 2 mM/l, and most preferably should contain neither sulfite nor hydroxylamine.

It is preferred that the color developer replenisher and the color developing solution contain compounds represented by the following general formula (I). By presence of the compounds, preservation of the photosensitive material is highly improved.

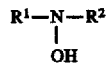          General formula (I)

In the general formula (I), $R^1$ and $R^2$ represent a hydrogen atom, a substituted or unsubstituted alkyl group, or a heterocyclic aromatic group. $R^1$ and $R^2$ are not a hydrogen atom together. $R^1$ and $R^2$ may be connected to each other to form a heterocycle together with a nitrogen atom. The heterocycle is a five-or six-ring in structure and is formed by a carbon atom, hydrogen atom, halogen atom, oxygen atom, nitrogen atom, sulfur atom and the like. The heterocycle may be either saturated or unsaturated.

It is preferred that $R^1$ and $R^2$ be alkenyls having preferably 1 to 10 carbon atoms and more preferably 1 to 5 carbon atoms. The nitrogen-containing heterocycles formed by connected $R^1$ and $R^2$ include a piperidyl group, a pyrrolidinyl group, a N-alkylpiperazyl group, a morpholyl group, an indolinyl group, a benzotrazole group and the like.

Examples of the compounds represented by general formula (I) will be numerated, hereinbelow. However the examples are given not by way of limitation.

The following compounds are added to the color developer replenisher and the color developing solution in an amount of 0.005 to 0.5 mol/l and preferably in an amount of 0.03 to 0.1 mol/l.

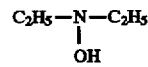          I-1

-continued

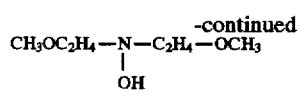

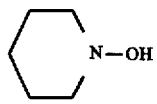

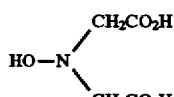

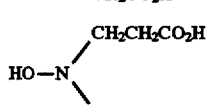

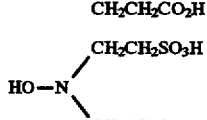

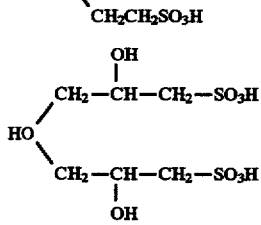

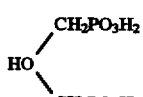

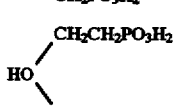

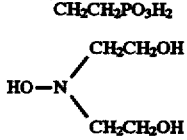

HO—NH—CH$_2$CO$_2$H

HO—NH—CH$_2$CH$_2$SO$_3$H

HO—NH—CH$_2$PO$_3$H

HO—NH—CH$_2$CH$_2$OH

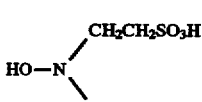

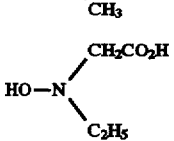

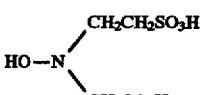

I-2

I-3

I-4

I-5

I-6

I-7

I-8

I-9

I-10

I-11

I-12

I-13

I-14

I-15

I-16

I-17

I-18

-continued

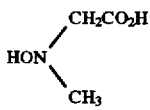

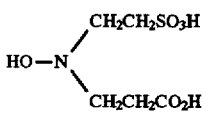

I-19

I-20

Other organic preservatives may be added, as required, in addition to the compounds represented by general formula (I).

The term "organic preservatives" generally means organic compounds which are added to the treatment solution of the color photosensitive material and suppress deterioration of the primary aromatic amine color developing agent That is, the organic preservatives are organic compounds which prevent oxidization of the color 10 developing agent by oxygen and the like. Hydroxam acids, hydrazines, hydrazides, phenols, α-hydroxyketones, α-aminoketones, sugars, monoamines, diamines, polyamines, quaternary ammonium salts, nitroxy, radicals, alcohols, oximes, diamide compounds and condensed ring amines are especially useful organic preservatives. These compounds are disclosed, for instance, in Japanese Patent Publication No. 48(1973)-30496, Japanese Unexamined Patent Publication Nos. 52(1977)-143020, 63(1988)-4235, 63(1988)-30845, 63(1988)-21647, 63(1988)-44655, 63(1988)-53551, 63(1988)-43140, 63(1988)-56654, 63(1988)-58346, 63(1988)-43138, 63(1988)-146041, 63(1988)-44657 and 63(1988)-44656, U.S. Pat. Nos. 3,615,503 and 2,494,903, Japanese Unexamined Patent Publication Nos. 1(1989)-97953, 1(1989)-186939, 1(1989)-186940, 1(1989)-187557 and 2(1990)-30624. Various kinds of metals described in Japanese Unexamined Patent Publication Nos. 57(1982)-44148 and 57(1982)-53749, salicylic acids described in Japanese Unexamined Patent Publication No. 59(1984)-180588, amines described in Japanese Unexamined Patent Publication Nos. 63(1988)-239477, 63(1988)-128340, 1(1989)-186939 and 1(1989)-187557, alkanolamines described in Japanese Unexamined Patent Publication No. 54(1979)-3532, plyehylene-imines described in Japanese Unexamined Patent Publication No. 56(1981)-94349 and aromatic polyhydroxy compounds described, for instance, in U.S. Pat. No. 3,746,544 may also be used as the preservative, if necessary.

The aromatic polyhydroxy compounds are especially preferred from the viewpoint of improvement in stability of the developing solution.

Generally the aromatic polyhydroxy compounds are compounds which has at least two hydroxy groups positioned in ortho-sites relative to each other on a aromatic ring. Those not having an unsaturated portion outside the aromatic ring are preferable. In a wide variety of aromatic polyhydroxy compounds employed in this embodiment, there are included compounds represented by the following general formula (II) such as benzene and naphthalene.

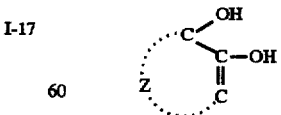

General formula (II)

In the general formula (II), Z represents an atomic group necessary for completing an aromatic nucleus.

The compounds described above may be substituted with a group or an atom such as a sulfo group, a carboxyl group and a halogen atom in addition to the hydroxy substituent groups.

Examples of aromatic polyhydroxy compounds which can be preferably employed are as follows.

II-1 pyrocatechol
II-2 4,5-dihydroxy-m-benzene-1,3-disulfonic acid
II-3 disodium 4,5-dihydroxy-m-benzene-1,3-disulfonate
II-4 tetrabromopyrocatechol
II-5 pyrogallol
II-6 sodium 5,6-dihydroxy-1,2,4-benzenetrisulfonate
II-7 gallic acid
II-8 methyl gallate
II-9 propyl gallate
II-10 2,3-dihydroxynaphthalene-6-sulfonic acid
II-11 2,3,8-trihydroxynaphthalene-6-sulfonic acid These compounds are added to the color developing solution and the color developer replenisher in an amount of 0.00005 to 0.1 moles per liter of the developing solution, generally in an amount of 0.0002 to 0.04 moles per liter and preferably in an amount of 0.0002 to 0.004 moles per liter.

The color developing solution should be preferably at pH 9 to 12 and more preferably at pH 9 to 11.0. The color developing solution may contain other known developing solution components. The color developer replenisher should be preferably at pH 11 to 14 and more preferably at pH 11.5 to 13.5. In order to minimize the amount of color developer replenisher to be replenished with and to prevent precipitation, an especially preferable pH range of the color developer replenisher is from 12.0 to 13.0.

In order to keep the color developer replenisher in the pH range, it is preferred to use various buffer solutions. As such buffer solutions may be employed carbonate, phosphate, borate, tetraborate, hydroxybenzoate, glycyl salt, N,N-dimethylglycolate, leucine salt, norleucine salt, guanine salt, 3,4-dihydroxyphenylalanine salt, aminobutyrate, 2-amino-2-methyl-1,3-propanediol salt, valine salt, proline salt, trishydroxyaminomethane salt, lysine and the like. Especially carbonate, phosphate, tetraborate and hydroxybenzoate are especially preferred since they are excellent in solubility and buffering in a high pH range not lower than 9.0, can be added to the color developing solution without adverse affection (such as fogging) and are inexpensive.

More specifically sodium carbonate, potassium carbonate, sodium bicarbonate, potassium bicarbonate, trisodium phosphate, tripotassium phosphate, disodium phosphate, dipotassium phosphate, sodium borate, potassium borate, sodium tetra borate (borax), potassium tetraborate, sodium o-hydroxybenzoate (sodium salicylate), potassium o-hydroxybenzoate, sodium 5-sulfo-2-hydroxybenzoate (sodium 5-sulfosalicylate), potassium 5-sulfo-2-hydroxybenzoate (potassium 5-sulfosalicylate) and the like may be used as the buffer solution.

Preferably the buffer solution is added to the color developing solution and the color developer replenisher in an amount of not less than 0.1 moles per liter and more preferably in an amount of 0.1 to 0.4 moles per liter.

Various kinds of chelating agents may be used in the color developing solution in order to prevent precipitation of calcium and/or magnesium and to improve the stability of the color developing solution. Such chelating agents include nitrilotriacetic acid, diethylenetriamine-N-N-N'-N"-N"-pentaacetic acid, ethylenediaminetetraacetic acid, N,N,N-trimethylenephosphonic acid, ethylenediamine-N,N,N',N'-tetramethylenephosphonic acid, transcyclohexanediaminetetraacetic acid, 1,2-diaminopropanetetraacetic acid, glycoletherdiaminetetraacetic acid, ethylenediamineorthohydroxyphenylacetic acid, 2-phosphonobutane-1,2,4-tricarboxylic acid, 1-hydroxyethylidene-1,1-diphosphonic acid, N,N'-bis(2-hydroxybenzyl)ethylenediamine-N-N'-diacetic acid, hydroxyethyliminodiacetic acid and the like. A plurality of kinds of chelating agents may be used if necessary.

The chelating agent may added in an amount sufficient to hinder metal ions in the color developing solution, e.g., 0.1 to 10 g/l.

Any development promotor may be added to the color developing solution if necessary.

As the development promotor may be used thioether compounds numerated in Japanese Patent Publication Nos. 37(1962)-16088, 37(1962)-5987, 38(1963)-7826, 44(1969)-12380 and 45(1970)9015, U.S. Pat. No. 3,318,247 and the like, p-phenylenediamine compounds numerated in Japanese Unexamined Patent Publication Nos. 52(1977)-49829 and 50(1975)-15554, quaternary ammonium salts numerated in Japanese Patent Publication No. 44(1969)-30074 and Japanese Unexamined Patent Publication Nos. 50(1975)-137726, 56(1981)-156826 and 52(1977)-43429, amine compounds numerated in U.S. Pat. Nos. 2,494,903, 3,128,182, 4,230,796, 3,253,919, 2,482,546, 2,596,926 and 3,582,346 and Japanese Patent Publication No. 41(1966)-11431, polyalkylene oxide described in Japanese Patent Publication Nos. 37(1962)-16088, 12(1967)-25201, 41(1966)-11431 and 42(1967)-23883 and U.S. Pat. Nos. 3,128,183 and 3,532,501, 1-phenyl-3 pyrazolidones, and imidazoles. Benzyl alcohol is described above.

As required, any fog-inhibiting agent may be added. As the fog-inhibiting agent, alkaline metal halides such as sodium chloride, potassium bromide and potassium iodide and organic fog-inhibiting agents may be used. Representative organic fog-inhibiting agents include heterocyclic nitrogen compounds such as benzotrizole, 6-nitrobenzimidazole, 5-nitroisoindazole, 5-methylbenzotrizole, 5-chlorobenzotrizole, 2-thiazolyl-benzimidazole, 2-thiazolylmethyl-benzimidazole, indazole, hydroxyazaindolizine, and adenine.

From the viewpoint of preventing variation in photographic properties, it is preferred that the chloride ion concentration in the color developing solution be $5 \times 10^{-2}$ to $2 \times 10^{-1}$ mols/liter. More preferably the chloride ion concentration in the color developing solution should be $6 \times 10^{-2}$ to $1.5 \times 1^{-1}$ mols/liter, and more preferably $8 \times 10^{-2}$ to $1.3 \times 10^{-1}$ mols/liter.

From the viewpoint of preventing variation in photographic properties, it is preferred that the bromide ion concentration in the color developing solution be $1 \times 10^{-4}$ to $4 \times 10^{-4}$ mols/liter. More preferably the bromide ion concentration in the color developing solution should be $1 \times 10^{-4}$ to $3.8 \times 10^{-2}$ mols/liter, and more preferably $1.5 \times 10^{-4}$ to $3.5 \times 10^{-4}$ mols/liter. It is more preferred that both the chloride ions and the bromide ions exist in the respective concentration ranges described above.

The color developing solution and the color developer replenisher may contain an opitcal whitening agent if necessary.

As such an opitcal whitening agent, triazinyl-4,4-diaminostilbene compounds are preferable. Among those, compounds represented by the following general formula (SR) are preferred from the viewpoint of dissolution in the color developer replenisher, prevention of precipitation in the color developer replenisher and reduction in stain of the photosensitive material after treatment.

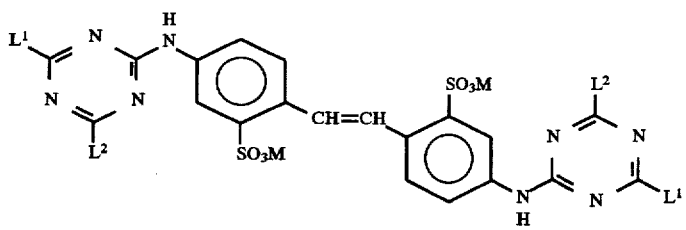

General formula (SR)

In the general formula (SR), $L^1$ and $L^2$ may either be the same or different and are represented by —$OR^1$ or —$NR^2R^3$ wherein $R^1$, $R^2$ and $R^3$ are hydrogens or alkyl groups with at least one of following conditions (1) or (2) satisfied.

(1) The four substituent groups $L^1$ and $L^2$ have at least four substituent groups in total selected from the following A-group general formulae.

(2) The four substituent groups $L^1$ and $L^2$ have two substituent groups in total selected from the following A-group general formulae and at the same time have two substituent groups in total selected from the following B-group general formulae.

A-group general formulae
—$SO_3M$, —$OSO_3M$, —COOM, —NR—X

B-group general formulae
—OH, —$NH_2$, —CN, —$NHCONH_2$

In the A-group general formulae, X represents a halogen atom and R represents an alkyl group.

In the general formula (SR) and the A-group general formulae, M represents a hydrogen atom, alkaline earth metal, ammonium or pyridinium.

Specific examples of $L^1$ and $L^2$ of the diaminostilbene compounds represented by the general formula (SR) are shown in the following tables 2 and 3, which is not given for the purpose of limitation.

TABLE 2

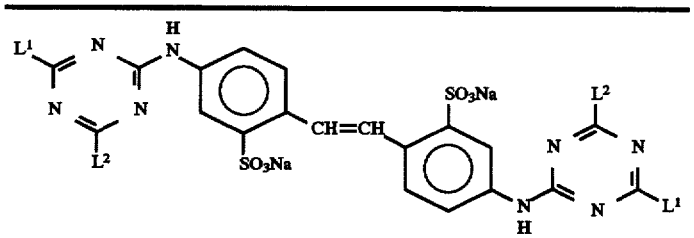

| No. | $L^1$ | $L^2$ |
|---|---|---|
| SR-1 | —NHCH₂CH(CH₃)SO₃Na | —NHCH₂CH(CH₃)SO₃Na |
| SR-2 | —$OC_2H_4OSO_3Na$ | —$OC_2H_4OSO_3Na$ |
| SR-3 | —N(C₂H₄OSO₃Na)₂ | —N(C₂H₄OSO₃Na)₂ |
| SR-4 | —$OC_2H_4SO_3H$ | —$OC_2H_4SO_3H$ |
| SR-5 | —$NHC_2H_4SO_3H$ | —$NHC_2H_4SO_3H$ |
| SR-6 | —$NHC_2H_4SO_3(NH_4)$ | —$NHC_2H_4SO_3(NH_4)$ |
| SR-7 | —$NHC_2H_4COOH$ | —$NHC_2H_4COOH$ |
| SR-8 | " | —$NHC_2H_4SO_3Na$ |
| SR-9 | —$NHC_2H_4COONa$ | —$NHC_2H_4COONa$ |
| SR-10 | " | —$NHC_2H_4SO_3Na$ |
| SR-11 | —$N(CH_3)_3Cl$ | —$N(CH_3)_3Cl$ |
| SR-12 | —$OC_2H_4SO_3Na$ | —$OC_2H_4SO_3Na$ |
| SR-13 | —$NHC_2H_4SO_3Na$ | —$NHC_2H_4SO_3Na$ |
| SR-14 | —N(CH₃)(C₂H₄OSO₃Na) | —N(CH₃)(C₂H₄OSO₃Na) |
| SR-15 | —N(C₂H₅)(C₂H₄OSO₃Na) | —N(C₂H₅)(C₂H₄OSO₃Na) |

TABLE 2-continued

[Structure: L¹-substituted triazine linked via NH-C(=N)-NH to phenyl(SO₃Na)-CH=CH-phenyl(SO₃Na)-NH-C(=N)-NH-triazine-L²]

| No. | L¹ | L² |
|---|---|---|
| SR-16 | —N(C₂H₄SO₃Na)₂ | —N(C₂H₄SO₃Na)₂ |
| SR-17 | —N(C₂H₄SO₃Na)₂ | —OCH₃ |
| SR-18 | " | —OH |
| SR-19 | " | —OC₂H₄OH |
| SR-20 | " | —NH₂ |
| SR-21 | " | —NHC₂H₄OH |
| SR-22 | " | —OC₂H₄NH₂ |
| SR-23 | " | —NHC₂H₄N(CH₃)₂ |
| SR-24 | —NHC₂H₄SO₃Na | —OC₂H₄SO₃Na |
| SR-25 | " | —N(CH₃)(C₂H₄OSO₃Na) |
| SR-26 | " | —N(C₂H₄OSO₃Na)₂ |
| SR-27 | " | —NHCH₂CH(CH₃)SO₃Na |

TABLE 3

[Structure: similar stilbene bis-triazinyl guanidine structure with L¹, L² substituents]

| No. | L¹ | L² |
|---|---|---|
| SR-28 | —OC₂H₄SO₃Na | —OH |
| SR-29 | " | —OC₂H₄NH₂ |
| SR-30 | " | —OCH₂CH(OH)CH₃ |
| SR-31 | " | —OC₂H₄OH |
| SR-32 | " | —NH₂ |

TABLE 3-continued

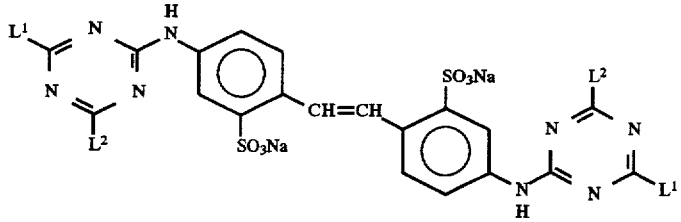

| No. | L¹ | L² |
|---|---|---|
| SR-33 | " | —N(C₂H₄OH)₂ |
| SR-34 | " | —NHC₂H₄OH |
| SR-35 | —NHC₂H₄SO₃Na | —OH |
| SR-36 | " | —OC₂H₄NH₂ |
| SR-37 | " | —OCH₂CH(OH)CH₃ |
| SR-38 | " | —OC₂H₄OH |
| SR-39 | " | —NH₂ |
| SR-40 | " | —N(C₂H₄OH)₂ |
| SR-41 | " | —NHC₂H₄OH |
| SR-42 | —NHC₂H₄SO₃Na | —N(CH₃)(C₂H₄OH) |
| SR-43 | " | —NHC₂H₄NHCONH₂ |
| SR-44 | " | —NHCH(CH₃)CH₂OH |
| SR-45 | " | —N(C₂H₄OH)₂ |
| SR-46 | " | —OC₂H₄OSO₃Na |
| SR-47 | —NHC₂H₄SO₃H | —OH |
| SR-48 | " | —OC₂H₄NH₂ |
| SR-49 | " | —OCH₂CH(OH)CH₃ |
| SR-50 | " | —OC₂H₄OH |
| SR-51 | " | —NH₂ |
| SR-52 | " | —N(C₂H₄OH)₂ |
| SR-53 | " | —NHC₂H₄OH |
| SR-54 | " | —N(CH₃)(C₂H₄OH) |
| SR-55 | —N(CH₃)(C₂H₄OSO₃Na) | —OH |
| SR-56 | " | —OC₂H₄NH₂ |
| SR-57 | " | —OC₂H₄OH |
| SR-58 | " | —NHC₂H₄OH |

TABLE 3-continued

[Structure showing diaminostilbene compound with L¹ and L² substituents, SO₃Na groups, and CH=CH linkage]

| No. | L¹ | L² |
|---|---|---|
| SR-59 | " | —N(C₂H₄OH)(C₂H₄OH) |
| SR-60 | —OC₂H₄OSO₃Na | —OH |
| SR-61 | " | —OC₂H₄NH₂ |
| SR-62 | " | —OC₂H₄COOH |
| SR-63 | " | —NH₂ |
| SR-64 | " | —NHC₂H₄OH |
| SR-65 | " | —N(C₂H₄OH)(C₂H₄OH) |
| SR-66 | —NHC₂H₄COONa | —OH |
| SR-67 | " | —OC₂H₄NH₂ |
| SR-68 | " | —OC₂H₄OH |
| SR-69 | —NHC₂H₄COONa | —NH₂ |
| SR-70 | " | —N(C₂H₄OH)(C₂H₄OH) |
| SR-71 | " | —NHC₂H₄OH |

The compound represented by the general formula (SR) may be used alone or together with one or more diaminostilbene compounds. In the latter case, it is preferred that the diaminostilbene compounds to be used together be diaminostilbene compounds represented by either the general formula (SR) or the following general formula (SR-c).

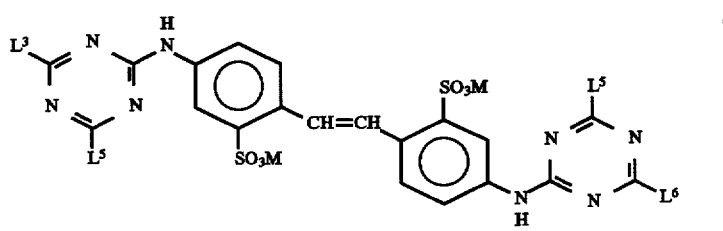

General formula (SR-c)

In the general formula (SR-c), $L^3$, $L^4$, $L^5$ and $L^6$ may either be the same or different and are represented by —$OR^8$ or —$NR^9R^{10}$ wherein $R^8$, $R^9$ and $R^{10}$ are hydrogens, alkyl groups or alkyl groups having a substituent group.

Specific examples of the compounds represented by the general formula (SR-c) are shown in the following table 4.

TABLE 4

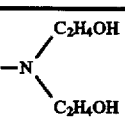

| No. | L³ | L⁴ | L⁵ | L⁶ |
|---|---|---|---|---|
| B-1 | —NHC₂H₄SO₃Na | —OCH₃ | —OCH₃ | —N(C₂H₄OH)(C₂H₄OH) |
| B-2 | —NHC₂H₄SO₃Na | —OCH₃ | —OCH₃ | —NHC₂H₄OH |
| B-3 | —NHC₂H₄SO₃Na | —NHC₂H₅ | —NHC₂H₅ | —NHC₂H₄OH |
| B-4 | —NHC₂H₄OH | —NHC₂H₄OH | —NHC₂H₄OH | —NHC₂H₄OH |
| B-5 | —OC₂H₄OH | —OC₂H₄OH | —OC₂H₄OH | —OC₂H₄OH |
| B-6 | —OC₂H₄OH | —OH | —OH | —OC₂H₄OH |
| B-7 | —OC₂H₄OH | —NH₂ | —NH₂ | —OC₂H₄OH |
| B-8 | —OC₂H₄OH | —OCH₃ | —OCH₃ | —OC₂H₄OH |
| B-9 | —OC₂H₄OH | —OC₂H₄OH | —OC₂H₄OH | —OC₂H₄OH |
| B-10 | —NHC₂H₄OH | —OC₂H₅ | —OC₂H₅ | —NHC₂H₄OH |
| B-11 | —OC₂H₄OH | —NHC₂H₅ | —NHC₂H₅ | —OC₂H₄OH |
| B-12 | —N(C₂H₅)(C₂H₄OH) | —OH | —OH | —N(C₂H₄)(C₂H₅OH) |

As the optical whitening agent to be used together with the compounds represented by the general formula (SR), commercially available diaminostilbene optical whitening agents may be used. Such commercially available diaminostilbene optical whitening agents are described, for instance, in "Dyeing Note" (Irozomesha, pp. 165 to 168, 19th edition). Among those described therein, "Whitex RP" and "Whitex BRF liq." are preferred.

If necessary, various kinds of surfactants may be added. Specific examples of surfactants are compounds represented by general formulae (I) and (II) described in Japanese Unexamined Patent Publication No. 4(1992)-195037 and compounds represented by general formulae (I) to (X) described in Japanese Unexamined Patent Publication No. 4(1992)-81750.

Preferably these compounds are added to the color developing solution and the color developer replenisher so that their surface tensions become 20 to 60 dyne/cm.

From the viewpoint of preventing precipitation especially of the developing agent on portions in the developing tank where the tank, a rack, developing solution and air are in contact with each other, it is especially preferred that compounds represented by general formula (I) described in Japanese Unexamined Patent Publication No. 5(1993)-333505 be added.

The developing temperature of the color developing solution is generally 20° to 50° C. and preferably 30° to 45° C. The developing time is 20 seconds to 5 minutes and preferably 30 seconds to 2 minutes.

The color developer replenisher is supplied generally in an amount of 20 to 1000 ml, preferably 30 to 200 ml, and more preferably 35 to 80 ml per m² of the photosensitive material.

As in bleaching/fixing replenisher, it is preferred from the viewpoint of improvement in stability that the surface of color developer replenisher be coated with swimming fluid to be described later.

Desilverization step may be described hereinbelow. The desilverization step are carried out in combination of bleaching step, fixing step and bleaching/fixing steps. Representative combinations of these steps are as follows.

(1) bleaching—fixing
(2) bleaching—bleaching/fixing
(3) bleaching—bleaching/fixing—fixing
(4) bleaching—washing—fixing
(5) bleaching/fixing Among these, (5) is preferable.

Treatment solution having bleaching power (a general term referring to both the bleaching solution and the bleaching/fixing solution) will be described, hereinbelow. It is necessary that the treatment solution having bleaching power should contain bleaching agent in an amount of 0.01 to 1 mole per liter, preferably 0.03 to 0.5 moles and more preferably 0.05 to 0.5 moles.

As the bleaching agent, Fe(III)-, Co(III)- or Mn(III)-chelating/bleaching agents, or persulfates (e.g., peroxisodisulfate) of the following compounds, hydrogen peroxide and bromates may be used.

The compounds for forming the chelating/bleaching agents include ethylenediaminetetraacetic acid, diethylenetriaminepentaacetic acid, ethylenediamine-N-(β-oxyethyl)-N,N',N'-triacetic acid, 1.2-diaminopropanetetraacetic acid, 1.3-diaminopropanetetraacetic acid, nitrilotriacetic acid, nitrilo-N-2-carboxyl-N-N-diacetic acid, N-(2-acetoamido) iminodiacetic acid, cyclohexanediaminetetraacetic acid, iminodiacetic acid, dihydroxyethylglycine, ethyletherdiaminetetraacetic acid, glycoletherdiaminetetraacetic acid, ethylenediaminetetrapropionic acid, phenylenediaminetetraacetic acid, 1,3-diaminopropanol-N,N,N',N'- tetramethylenephosphonic acid, ethylenediamine-N,N,N',N'-tetramethylenephosphonic acid, 1,3propylenediamine-N,N,N',N'-tetramethylenephosphonic acid, sodium salts of these compounds and ammonium salts of these compounds. Among those, 1.3-diaminopropanetetraacetic acid, nitrilo-N-2-carboxyl-N-N-diacetic acid, N-(2-acetoamido)iminodiacetic acid and ethylenediaminetetraacetic acid are especially preferred.

Further compounds represented by the following general formula (E) are also preferred.

In the general formula (E), $R_1$, $R_2$, $R_3$, $R_4$, $R_5$ and $R_6$ represent a hydrogen atom, a fatty group, an aromatic group or a hydroxy group. W represents a bivalent binding group containing a carbon atom. $M_1$, $M_2$, $M_3$ and $M_4$ represent a hydrogen atom or a cation. Specific examples of the compounds represented by the general formula (E) are as follows.

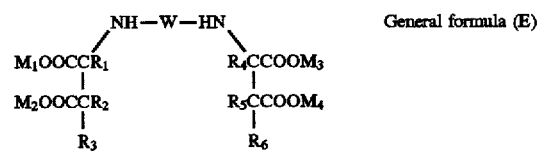

General formula (E)

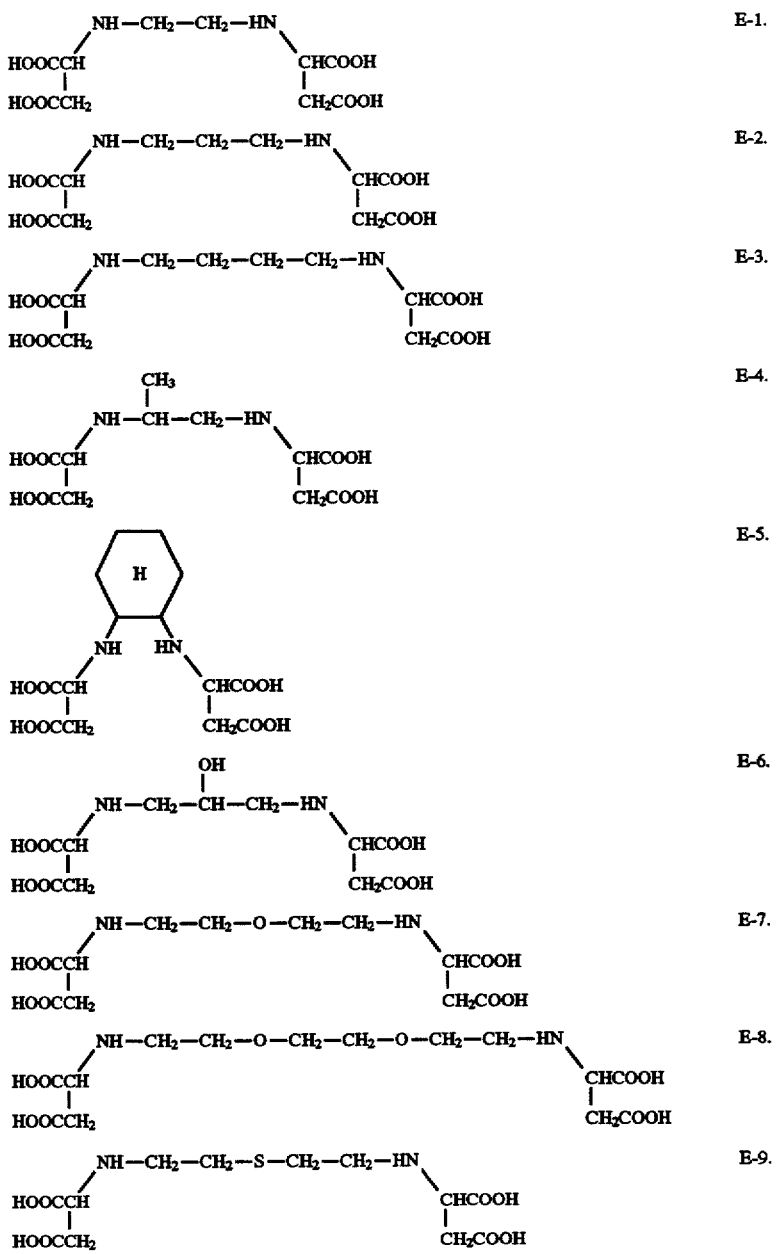

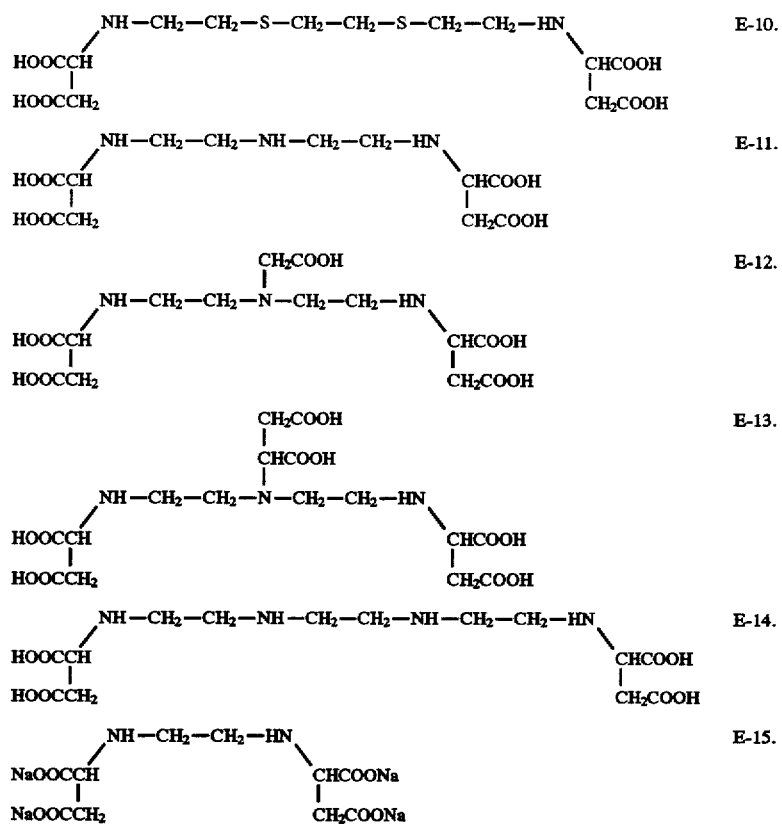

The compounds represented by the general formula (E) may include any optical isomer. They may be [S.S] materials, [S.R] materials or [R.R] materials or isomers of such materials. Among those, compounds synthesized from L-form amino acids, e.g., [S.S] materials of (E-1) and (E-2) shown above, are especially preferred from the viewpoint of stability of the bleaching/fixing solution, desilverization and biodegradability.

It is preferred that the treatment solution having bleaching power be added with halides such as chlorides, bromides and iodides as re-halogenating agents for promoting oxidization of silver. Organic ligands which form difficulty-soluble silver salts may be added to the treatment solution having bleaching power in place of the halides. The halides are added in the form of an alkaline metal salt, an ammonium salt or a salt of guanidine, amine or the like. Specifically, potassium bromide, sodium bromide, ammonium bromide, potassium chloride and guanidine hydrochloride may be used. Potassium bromide and sodium bromide are preferred. The concentration of the re-halogenating agents in the bleaching solution should be not higher than 2 mols/l, preferably 0.01 to 2.0 mols/l, and more preferably 0.1 to 1.7 mols/l.

The bleaching/fixing solution contains fixing agents (to be described later) and may contain all the compounds contained in fixing solutions described later. Further the bleaching/fixing solution may contain the re-halogenating agents described above if necessary. The concentration of the re-halogenating agents in the bleaching/fixing solution should be 0.001 to 2.0 mols/l, and preferably 0.001 to 1.0 mol/l.

Bleaching promotors, corrosion inhibitors for preventing corrosion of baths, buffers for keeping pH of the solution, optical whitening agents, anti-foaming agents and the like are added to the bleaching solution or the bleaching/fixing solution as needed. As the bleaching promotor, compounds having a mercapto group or a disulfide group described, for instance, in U.S. Pat. No. 3,893,858, German Patent No. 1,290,812, U.S. Pat. No. 1,138,842, Japanese Unexamined Patent Publication No. 53(1978)-95630 and Research Disclosure No. 17129 (1978), thiazolidine derivatives described in Japanese Unexamined Patent Publication No. 50(1975)-140139, thiourea derivatives described in U.S. Pat. No. 3,706,561, polyethyleneoxides described in German Patent No. 2,748,430, polyamine compounds described in Japanese Patent Publication No. 45(1970)-8836, and imidazole compounds described in Japanese Unexamined Patent Publication No. 49(1974)-40493 may be used. The mercapto compounds described in U.S. Pat. No. 1,138,842 are preferred.

As the corrosion inhibitor, nitric acid solutions are preferred. For example, ammonium nitrate, sodium nitrate and potassium nitrate may be used. The amount of the corrosion inhibitor should be 0.01 to 2.0 mols/l and preferably 0.05 to 0.5 mols/l.

In the bleaching solution or the bleaching/fixing solution, it is preferred that the total ammonium ion concentration be not higher than 0.3 gram ions/l. This is preferable from the viewpoint of image stability and environmental protection, and it is more preferred that the total ammonium ion concentration be not higher than 0.1 mols/l.

The bleaching solution or the bleaching/fixing solution should be at pH 2.0 to 8.0 and preferably at pH 3.0 to 7.5. When bleaching or bleaching/fixing is carried out just after color-forming development, pH of the solution should be not higher than 7.0 and preferably not higher than 6.4 in order to suppress bleaching-fogging. Especially in the case of bleaching solution, pH of the solution should preferably be 3.0 to 5.0. When pH of the solution is not higher than 2.0, metal chelates become instable. Accordingly pH of the solution is preferably 2.0 to 6.4.

As the pH buffers, any buffer may be used so long as it is less susceptible to oxidization by the bleaching agent and can function as a buffer in the pH range described above. For example, organic acids such as acetic acid, glycol acid, lactic acid, propionic acid, butyric acid, malic acid, chloracetic acid, levulinic acid, ureidopropionic acid, nitric acid, malonic acid, succinic acid, glutaric acid, maleic acid, fumaric acid, citraconic acid, itaconic acid, β-hydroxypropionic acid, tartaric acid, citric acid, axalacetic acid, diglycol acid, benzoic acid, phthalic acid, and the like, and organic bases such as pyridine, dimethylpyrazole, 2-methyl-o-oxazoline, aminoacetonitril and the like may be used. One or more of the buffers may be used. Organic acids at pH 2.0 to 5.5 are preferred. Especially it is preferred that acetic acid and glycol acid be used separately or together. The amount of the buffers generally should be not larger than 3.0 moles per liter of the treatment solution in total and preferably 0.12 to 2.0 moles per liter in total.

In order to control pH of the treatment solution having bleaching power, the aforesaid acids and alkaline compounds (e.g., ammonia water, KOH, NaOH, imidazole, monoethanolamine, diethanolamine) may be used together. KOH is preferred.

The bleaching or bleaching/fixing is carried out in the temperature range of 30° to 60° C. and preferably in the range of 35° to 50° C.

The bleaching time or the bleaching/fixing time is generally 10 seconds to 2 minutes, preferably 10 seconds to 1 minute, and more preferably 15 seconds to 45 seconds. Under these conditions, bleaching or bleaching/fixing can be carried out at high speed without increasing stain.

Various known fixing agents may be used in the bleaching/fixing solution or the fixing solution. For example, thiosulfates, thiocyanates, thioethers, amines, mercaptos, thiones, thiourea, iodide salts, mesoionic compounds and the like may be used. Specifically, ammonium thiosulfates, sodium thiosulfates, potassium thiosulfates, guanidine thiosulfates, potassium thiocyanates, dihydroxyethyl-tioether, 3,6-dithia-1,8-octanediol and imidazole may be used. Among those, thiosulfates, especially ammonium thiosulfates is preferable in carrying out fixing at a high speed. Further, by using a plurality of kinds of fixing agents, fixing speed can be further increased. For example, it is preferred to use ammonium thiocyanate, imidazole, thiourea and/or thioether together with ammonium thiosulfate. It is preferred that the fixing agent(s) to be used together with ammonium thiosulfate be added to ammonium thiosulfate in amount of 0.01 to 100 mol %.

The amount of the fixing agent is 0.1 to 3.0 moles per liter of the bleaching/fixing solution or the fixing solution and preferably 0.5 to 2.0 moles per liter. Though depending on the kind of the fixing agent, pH of the fixing solution is generally 3.0 to 9.0. When thiosulfate is used, it is preferred that pH of the fixing solution be 6.5 to 8.0 in obtaining an excellent stabilizing performance.

It is possible to add preservative to the bleaching/fixing solution or the fixing solution to improve stability with time. In the case of a bleaching/fixing is solution or a fixing solution containing therein thiosulfates, sulfite and/or hydroxylamine, hydrazine, addition compound of aldehyde with bisulfite (e.g., addition compound of acetaldehyde with bisulfite, especially preferably addition compounds of aromatic aldehydes with bisulfite described in Japanese Unexamined Patent Publication No. 1(1989)-298935) are effective as the preservative. Further sulfinic acid compounds described in Japanese Unexamined Patent Publication No. 62(1987)-143048 are also preferred.

Sulfinic acids and their salts will be described, hereinbelow.

General formula (S)

(In the general formula (S), R represents an alkyl group, an alkenyl group, a cycloalkyl group, an aralkyl group, an aryl group or a heterocyclic group and M represents an cation. n stands for 1 or 2.)

Specifically R represents a substituted or unsubstituted alkyl group (methyl group, ethyl group, n-propyl group, hydroxyethyl group, sulfoethyl group, carboxyethyl group, methoxyethyl group and the like), a substituted or unsubstituted alkenyl group (allyl group, butenyl group and the like), a substituted or unsubstituted. aralkyl group (benzyl group, phenethyl group, 4-carboxyphenylmethyl group, 3-sulfophenylmethyl group and the like), a substituted or unsubstituted cycloalkyl group (cyclohexyl group and the like, a substituted or unsubstituted aryl group (phenyl group, 4-methylphenyl group, naphthyl group, 3-carboxyphenyl group, 4-methoxyphenyl group, 3-sulfophenyl group, 4-carboxymethoxyphenyl group, 3-carboxymethoxyphenyl group, 4-carboxyethoxyphenyl group, 4-sulfoethoxyphenyl group, 4-carboxymethylphenyl group, 4-(N-carboxymethyl-N-methyl)phenyl group and the like) and a substituted or unsubstituted heterocyclic group (pyridyl group, furil group, thienyl group, pyrazolyl group, indolyl group and the like). M represents a cation such as a hydrogen atom, an alkaline metal, an alkaline earth metal, a nitrogen-containing organic base, an ammonium group and the like.

The alkaline metal may be Na, K, Li or the like, the alkaline earth metal may be Ca, Ba or the like, the nitrogen-containing organic base may be normal amines which can form a salt with sulfinic acid, and the ammonium group may be an unsubstituted ammonium group, a tetramethylammonium group or the like. When the group represented by R in the general formula (S) has a substituent group, the example of the substituent groups are as follows. Nitro groups, halogen atoms (chlorine atom, bromine atom or the like), cyano group, alkyl groups (methyl group, ethyl group, propyl group, carboxymethyl group, carboxyethyl group, carboxypropyl group, sulfoethyl group, sulfopropyl group, dimethylaminoethyl group or the like), aryl groups (phenyl group, naphthyl group, carboxyphenyl group, sulfophenyl group or the like), alkenyl groups (allyl group, butenyl group or the like), aralkyl groups (benzyl group, phenethyl group or the like), sulfonyl groups (methanesulfonyl group, p-toluenesulfonyl group or the like), acyl groups (acetyl group, benzoyl group or the like), carbamoyl groups (unsubstituted carbamoyl group, dimethylcarbamoyl group or the like), sulfamoyl groups (unsubstituted sulfamoyl group, methylsulfamoyl group, dimethylsulfamoyl group or the like), carvoneamido groups (acetoamido group, benzamido group or the like), sulfonamido groups (methanesulfonamido group, benzsulfonamido group or the like), acyloxy groups (acetyloxy group, benzoyloxy group or the like), sulfonyloxy groups (methanesulfonyloxy group or the like), ureido groups (unsubstituted ureido group or the like), thioureido groups (unsubstituted thioureido group, methylthioureido group or the like), carboxylic acids or their salts, sulfonic acids or their salts, hydroxy groups, alkoxy groups (methoxy group, ethoxy group, carboxyethoxy group, carboxymethoxy group, sulfoethoxy group, sulfopropyloxy group or the like), alkylthio groups (methylthio group, carboxymethylthio group, sulfoethylthio group or the like), and amino groups (unsubstituted amino group, dimethylamino group, N-carboxyethyl-N-methylamino group or the like).

In the general formula (S), preferably R represents a substituted or unsubstituted aryl group or a substituted or unsubstituted heterocyclic group and more preferably R represents an aryl group substituted by at least one of an alkyl group, an alkoxy group and an alkylamino group each of which containing a carboxylic acid or its salt, or sulfonic acid or its salt, an alkoxy group.

In the general formula (S), preferably n represents 1. Each of the alkyl group, alkoxy group and alkylamino group has preferably less than 11 carbon atoms and more preferably less than 7 carbon atoms. Preferably the aryl group is substituted by two or three such substituent groups. Further the number of carbon atoms is preferably not larger than 20 in total.

Preferably the aryl group is a phenyl group or a naphthyl group with the former preferable to the latter. When the replenisher A is kept standing for a long time and treatment is run using the replenisher A, suspended matters are apt to be generated in the solution in the tank. Phenyl group is advantageous in preventing generation of such suspended matters and in preventing deterioration in the photosensitivity.

Specific examples of the compounds represented by the general formula (S) are as follows.

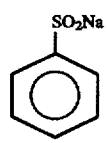 (S-1)

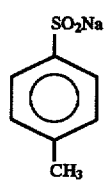 (S-2)

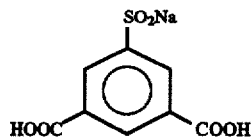 (S-3)

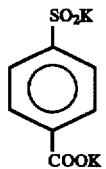 (S-4)

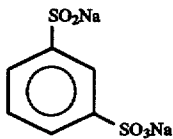 (S-5)

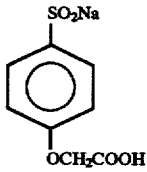 (S-6)

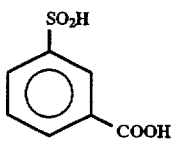 (S-7)

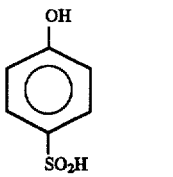 (S-8)

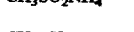 (S-9)

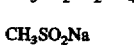 (S-10)

 (S-11)

 (S-12)

Each of the compounds may be used alone or in the form of a mixture with one or more of other compounds. Sulfinic acid compounds can be synthesized in the light of known documents, e.g., "J. Am. Chem. Soc." 72,1215 (1950); 62,2596 (1940); 60,544 (1938); 56,1382 (1934); 57,2166 (1935); 81,5430 (1959); and "Chem. Rev." 48.69 (1951).

The sulfinic acid is used in an amount of 0.001 to 1.0 mol/l and preferably 0.002 to 0.2 mols/l.

It is preferred that the bleaching/fixing solution or the fixing solution be added with buffer in order to keep constant pH of the solution. For example, phosphate; imidazoles such as imidazole, 1-methyl-imidazole, 2-methylimidazole and 1-ethyl-imidazole; triethanolamine; N-allylmorpholine; and N-benzoylpiperazine may be used.

It is possible to add various kinds of chelating agents to the fixing solution in order to hinder iron ions from the bleaching solution, thereby improving the stability of the fixing solution. For example, the following chelating agents are preferred. 1-hydroxyethylidene-1,1-diphosphonic, ethylenediamine-N-N-N'-N'-tetramethylene phosphonic acid, nitrilotrimethylenephosphonic acid, ethylenediaminetetraacetic acid, diethylenetriaminepentaacetic acid, cyclohexanediaminetetraacetic acid, and 1,2-propanediaminetetraacetic acid. Fixing may be carried out at 30° to 60° C. and preferably at 30° to 50° C. The fixing time is 5 seconds to 2 minutes, preferably 10 seconds to 100 seconds and more preferably 10 seconds to 45 seconds.

The replenishing amount of bleaching solution is 20 to 900 ml per m² of the photosensitive material, preferably 20 to 550 ml per m² and more preferably 30 to 250 ml per m² The replenishing amount of bleaching/fixing solution is 20 to 1500 ml per m of the photosensitive material, preferably 30 to 600 ml per m² and more preferably 30 to 200 ml per m². The bleaching/fixing solution may be replenished either in one solution or in separate solutions of bleaching composition and fixing composition. Further a mixture of overflow solutions from the bleaching bath and the fixing bath may used as the replenisher.

The replenishing amount of fixing solution is 20 to 1500 ml per m² of the photosensitive material, preferably 30 to 600 ml per m² and more preferably 30 to 200 ml per m².

By returning overflow solutions of the washing step and the stabilizing step to the bath of the solution having fixing power, the amount of waste liquor can be reduced.

After treatment with the solution having fixing power, washing step is generally carried out. However, after treatment with the solution having fixing power, stabilizing treatment with a stabilizer solution may be carried out without washing step.

The replenishing amount in the washing step or the stabilizing step is generally 3 to 50 times, preferably 3 to 30 times and more preferably 3 to 10 times, the amount of the solution carried over from the preceding bath per unit area. In the case where a stabilizing step is carried out after a washing step and the replenishing amount at least in the final stabilizing step is 3 to 50 times, the method is effective. The replenishment may be carried out either continuously or intermittently. The solution used in the washing step and/or the stabilizing step may be further used in the preceding steps. For example, by causing overflow of washing water reduced by a multi-stage counterflow system to flow into the preceding bleaching/fixing bath and replenishing the bleaching/fixing bath with a condensed solution, the amount waste liquor can be reduced.

The amount of washing water may be variously set depending on the properties of the photosensitive material (e.g., materials of couplers and the like), applications of the same, the temperature of the washing water, replenishing method (counterflow or direct flow), and other various conditions. In a multi-stage counterflow system, generally the number of the stages is preferably 2 to 6 and more preferably 2 to 4. By the multi-stage counterflow system, the amount of washing water can be greatly reduced, e.g., to not more than 0.5 to 1.0 liter per m of the photosensitive material. However the retention time of water in the tank increases, which gives rise to a problem that bacteria grow in the tank and suspended matter can adhere to the photosensitive material. In order to overcome such a problem, a method in which the amount of calcium and magnesium is reduced as disclosed in Japanese Unexamined Patent Publication No. 62(1987)-288838 may be effectively used.

Further use of water sterilized by halogens, an ultraviolet germicidal lamp or an ozonizer is also preferred.

It is preferred that various antibacterial agents or mildewproofing agents be added to washing water and the stabilizing solution in order to prevent formation of fur and/or generation of mildew on photosensitive materials after treatment. As such antibacterial agents or mildewproofing agents may used, for instance, thiazolylbenzoimidazole compounds described in Japanese Unexamined Patent Publication Nos. 57(1982)-157244 and 58(1983)-105145, iso-thiazolone derivatives described in Japanese Unexamined Patent Publication No. 57(1982)-8542, chlorophenol compounds represented by trichlorophenol, bromophenol compounds, organic compounds of tin or zinc, acid amide compounds, diazine or triazine compounds, thiourea compounds, benzotriazole Compounds, alkylguanidine compounds, quaternary ammonium salts represented by benzalchonium chloride (benzal chloride), antibiotics represented by penicillin and other general purpose agents described in "J. Antibact. Antifung. Agents", Vol. 1, No. 5, pp. 207 to 223, 1983, "Chemistry of antibacteria and antifungi", by Hiroshi Horiguchi, 1986, Sankyou Shuppan, "Antibacterial and Antifungal Technology" edited by Eisei Gijutsukai, 1986, Kougyou Gijutsukai, and "Dictionary of Antibacterial and Antifungal Agents" edited by Japan Boukin Boukabi Gakkai, 1986. Further various sterilizing agents described in Japanese Unexamined Patent Publication No. 48(1973)-83820 may also be used.

In order to prevent nonuniformity in hydro-extraction during drying of the photosensitive materials, it is preferred that the washing water and the stabilizing solution be added with various surface active agents. As such surface active agents may be used polyethyleneglycol type nonionic surface active agents, polyhydroxy alcohol type nonionic surface active agents, alkylbenzenesulfonate type anionic surface active agents, higher alcohol sulfate type anionic surface active agents, alalkylnaphthalenesulfonate type anionic surface active agents, quaternary ammonium salt type cationic surface active agents, amine salt type cationic surface active agents, amino salt type amphoteric surface active agents, and betaine amphoteric surface active agents. Among those, nonionic surface active agents, especially alkylphenolethyleneoxide-addition compounds, are preferred. As the alkylphenol, octyl, nonyl, dodecyl and dinonylphenol are preferred. The number of moles of ethyleneoxide added is preferably 8 to 14. Use of silicone surface active agents which are excellent in anti-foaming effect is also preferred.

Preferably washing water and the stabilizing solution contain various chelating agents. Aminopolycarboxyl acids such as ethylenediaminetetraacetic acid, diethylenetriaminepentaacetic acid and the like, organic phosphonic acids such as 1-hydroxyethylidene-1,1-diphosphonic acid, ethylenediaminetetraacetic acid, diethylenetriamine-N,N,N',N'-tetramethylenephosphonic acid and the like, and hydrolyzates of maleic unhydride polymer and the like are preferred.

Further the stabilizing solution contains compounds for stabilizing dye-images such as formalin, hexamethylenetetramine and its derivatives, hexahydrotriazine and its derivatives, dimethylolurea, N-methylol compounds such as N-methylolpirazole, organic acids, pH buffers and the like. Preferably these compounds are added in an amount of 0.001 to 0.02 mols per liter of the stabilizing solution. It is preferred that the free formaldehyde concentration be as low as possible in order to suppress fly of formaldehyde gas. Thus as the dye-image stabilizing agent, N-methylolazoles such as hexamethylenetetramine, N-methylolpirazole and the like described in Japanese Patent Application No. 3(1991)-318644, and azolylmethylamins such as N,N'-bis (1,2,4-triazo le-1-yl)piperazine described in Japanese Patent Application No. 3(1991)-142708 are preferred. Further is also preferred that the stabilizing solution contains as required ammonium compounds such as ammonium chloride and ammonium sulfite, compounds of metal such as Bi and Al, optical whitening agents, hardeners, alkanolamines described in U.S. Pat. No. 4,786,583, and preservatives which can be contained in the aforesaid fixing solution and bleaching/fixing solution. Among those, sulfinic acids described in Japanese Unexamined Patent Publication No. 1(1989)-231051 (e.g., bezenesulfinic acid and its salts of sodium, potassium and the like) are preferred. These compounds are added to the stabilizing solution preferably in an amount $1 \times 10^{-5}$ to $1 \times 10^{-3}$ mols/l and more preferably $3 \times 10^{-5}$ to $5 \times 10^{-4}$ mols/l.

The replenishing amount in the washing step or the stabilizing step is generally 50 to 2000 ml per $m^2$ of the photosensitive material and preferably 100 to 1000 ml per $m^2$.

As a means for reducing the replenishing amount without deteriorating stability of the dye-images, reverse osmosis process using a reverse osomosis membrane disclosed in Japanese Unexamined Patent Publication No. 3(1991)-55542 is effective.

In the reverse osmosis process, the solution in at least one of the baths in the washing step and/or stabilizing step is brought into contact with a reverse osomosis membrane and the liquid permeating through the reverse osomosis membrane is returned to the baths in the washing step and/or stabilizing step.

Preferably the washing and/or stabilizing step of the multi-stage counterflow system is formed by two to six baths, more preferably 3 to 5 baths and especially preferably 4 or 5 baths. All the baths may be washing baths or stabilizing baths.

When the washing and/or stabilizing step of the multi-stage counterflow system is formed by three or more baths, it is preferred that the reverse osmosis membrane is disposed in a bath downstream of the uppermost bath (first bath as number from the upstream side) and just upstream of the lowermost bath. In this case, it is further preferred that the purified liquid permeating through the reverse osmosis membrane be returned to a bath downstream of the bath in which the membrane is disposed and the condensed liquid be returned to the bath in which the membrane is disposed.

It is especially preferred that the washing and/or stabilizing step of the multi-stage counterflow system be formed by four or more baths and the reverse osmosis membrane be disposed in a bath downstream of the second uppermost bath.

Though there have been known a high-pressure reverse osmosis membrane, an intermediate-pressure reverse osmosis membrane and a low-pressure reverse osmosis membrane, the low-pressure reverse osmosis membrane is preferred.

Specifically such a reverse osmosis membrane that, when an aqueous NaCl solution containing therein NaCl in 2000 ppm is processed at 25° C. under a pressure of 5 Kg/cm$^2$, screens out 30 to 90% of NaCl from the liquid permeating therethrough. When such a loose reverse osmosis membrane is used, a large amount of liquid permeates through the membrane at a relatively pressure and even EDTA-Fe which causes stain can be sufficiently removed.

The reverse osmosis membrane comprise a skin layer which governs the performances of the membrane such as the amount of liquid permeating through the membrane and the screening rate and a support layer which supports the skin layer. When the skin layer and the support layer are of the same material, the reverse osmosis membrane is referred to as a nonsymmetric membrane and when they are of different materials, the reverse osmosis membrane is referred to as a composite membrane.

A synthetic composite membrane is preferred from the viewpoint of the screening rate, the amount of permeating liquid and durability to EDTA-Fe. Such synthetic composite membrane is described in detail in "Development and Practical Application of Advanced Separation", Separate Volume Chemical Industry 29-7, pp. 156 to 172, published by Kagaku Kougyou. Such synthetic composite membranes are commercially available from Daiseru Kagaku Kougyou (DRA-40, DRA-80, DRA-89) and Toray (SU-200, SU-210, SU-220). The delivery pressure of the solution to be supplied to the reverse osmosis membrane is preferably 2 to 20 Kg/cm$^2$, more preferably 3 to 15 Kg/cm$^2$, further more preferably 3 to 10 Kg/cm$^2$, and most preferably 3 to 6 Kg/cm$^2$.

When the supply of purified liquid (the amount of liquid which is supplied to a bath downstream of the bath in which the membrane is disposed after permeating through the reverse osmosis membrane and purified thereby) is represented by F, the amount of condensed liquid (the amount of liquid condensed by the reverse osmosis membrane and returned to the bath in which the membrane is disposed) is represented by C and the amount of fresh solution to be replenished is represented by R, it is preferred that F is not smaller than R, and it is more preferred that F is two to two hundred times R. It is further more preferred that F is five to one hundred and fifty times R and it is most preferred that F is ten to hundred times F. Further it is preferred that C is not smaller than F and it is more preferred that C is two to hundred times F. It is further more preferred that C is three to fifty times F and it is most preferred that C is five to thirty times F. The amount of flow rates F, C and R used here are in terms of flow rate per day.

When the reverse osmosis process is carried out, the replenishing amount in the washing step or the stabilizing step may be 200 ml or less per m$^2$ of the photosensitive material, preferably 30 to 200 ml and more preferably 50 to 150 ml. Water and the stabilizing solution are generally used at a pH in the range of 4 to 10 and preferably in the range of 6 to 9. It is preferred that water and the stabilizing solution be processed at 30° to 45° C.

The processing time is generally 10 seconds to 2 minutes and preferably 10 to 60 seconds.

In order to further reduce the amount of the replenisher for the purpose of environmental protection, it is also preferable to use various regenerating methods in combination. Regeneration may be effected by recirculating the solution in an automatic processor or by once removing the solution form the bath and returning to the bath as replenisher after subjected to suitable regenerating process.

Especially the developing solution can be regenerated and used again.

Regeneration of the developing solution is a process of recovering the activity of used developing solution by processing the used developing solution with anion exchange resin, subjecting the used developing solution to electrodialysis or adding regenerant to the used developing solution. The ratio of regeneration (the proportion of the overflow in the replenisher) is preferably not less than 50% and more preferably not less than 70%.

When the developing solution is regenerated, overflow of the developing solution is regenerated and is used as the replenisher. It is preferred that the developing solution be regenerated by use of anion exchange resin. Especially preferable anion exchange resin composition and method of regenerating the anion exchange resin are described in "Daia-ion Manual (I)" published by Mitsubishikasei Kougyou, 14th edition, 1986. Anion exchange resins having compositions described in Japanese Unexamined Patent Publication Nos. 2(1990)-952 and 1(1989)-281152 are preferred.

It is especially preferred from the viewpoint of simplicity that the developing solution be regenerated by simply adding regenerant to overflow of the solution without using anion exchange resin nor electrodialysis as disclosed in Japanese Unexamined Patent Publication No. 3(1981)-174154.

Metal chelate in the bleaching solution or the bleaching/fixing solution becomes reduced after bleaching process, and accordingly it is preferred that the bleaching solution or the bleaching/fixing solution be regenerated by a continuous regeneration method linked with the bleaching or bleaching/fixing treatment. Specifically, it is preferred that the metal chelate be regenerated by oxidizing again the metal chelate in reduced state by blowing air into the bleaching solution or the bleaching/fixing solution with an air pump (aeration). Otherwise the metal chelate may be regenerated by adding an oxidizing agent such as hydrogen peroxide, persulfate or bromate.

Regeneration of the fixing solution and the bleaching/fixing solution is carried out by electrolytic reduction of accumulated silver ions. Further removing accumulated silver ions by anion exchange resin is also preferable in keeping the fixing power.

From the viewpoint of simplicity, it is most preferred that the bleaching/fixing solution be converted to replenisher by simply adding regenerant to overflow of the solution without using anion exchange resin nor aeration as disclosed in EP 479262A1.

Silver can be recovered from the solution having fixing power and regenerated solution may be reused. An electrolysis method (French Patent No. 2,299,667), a precipitation method (Japanese Unexamined Patent Publication No. 52(1977)-73037 and German Patent No. 2,331,220), an ion exchange method (Japanese Unexamined Patent Publication No. 51(1976)-17114 and German Patent No. 2,548,237), a metal substitution method and the like are effective to recover silver. Processing speed of such methods of silver recovery can be increased by carrying out by an in-line system in the solution in the tank.

The solution may be used in processing of color reversal photosensitive materials. In this case, the color-forming developing is carried out in one of the following procedures.

(1) black and white development—washing—reverse exposure—color-forming developing
(2) black and white development—washing—reversed processing—color-forming developing
(3) black and white development—washing—color-forming developing In the case of the third procedure, it is preferred that the color-forming developing solution contains a fogging agent for reversed process. In processes for the color reversed process, compounds and conditions described in Japanese Unexamined Patent Publication No. 3(1991)-71130 (page 14, lower right column, last line–page 16, upper right column, line 3) may be used. In the black and white developing solution, hydroxylamines having a substituent group described above in conjunction with the color-forming developing solution may be used.

The processes described above may be carried out by an automatic developing machine. A preferable example of such an automatic developing machine will be described hereinbelow.

It is preferred that the opening area by which the solution in the processing tank or the replenisher tank is in contact with air be as small as possible. For example, when the ratio of the opening area ($cm^2$) to the volume ($cm^3$) of the solution in the tank is defined as an opening factor, the opening factor is preferably not larger than 0.01 ($cm^{-1}$), more preferably not larger than 0.005 and most preferably not larger than 0.001.

It is preferred that solid or liquid isolating means which floats on the solution in the tank and isolates the solution from air be provided in the tank, thereby reducing the contact area of the solution with air.

For example the isolating means may be a float of plastic or the like or liquid such as liquid paraffin, liquid saturated hydrocarbon and the like which neither react or mix with the solution.

In order to increase the processing speed, the time required to transfer the photosensitive material from one processing solution to another (crossover time) should be as short as possible and preferably not longer than 10 seconds, more preferably not longer than 7 seconds and most preferably not longer than 5 seconds. In order to realize such a short crossover time, it is preferred to use an automatic processing machine for motion picture film especially of leader transfer type. The automatic processing machine of this type is available from Fuji Film as "Automatic Processing Machine FP-560B".

The linear transfer speed is generally 30 cm to 60 m/min., preferably 50 cm to 20 m/min. and more preferably 80 cm to 10 m/min.

As the means for transferring the leader or the photosensitive material, a belt transfer system described in Japanese Unexamined Patent Publication Nos. 60(1985)-191257, 60(1985)-191258 and 60(1965)-191259 are preferred. As the transfer mechanisms, systems respectively described in Japanese Patent Application Nos. (1)1989-265794, (1)1989-266915 and (1)1989-266916 are preferred.

In order to shorten the crossover time and to prevent mixing of the processing solutions, use of the crossover rack provided with a mixing preventing plate described in Japanese Patent Application No. 1(1989)-265795 is preferred.

It is preferred that each processing solution, especially, the color-forming developing solution, the bleaching solution and the bleaching/fixing solution, be compensated for evaporation thereof by supplying water to the solution in amount corresponding to the amount of evaporation of the solution.

Such replenishment of water may be preferably carried out, for instance, by preparing a monitor water tank separately from the bleaching solution tank, measuring the evaporation loss of the water in the monitor water tank, calculating the evaporation loss of the water in the bleaching solution tank on the basis of the evaporation loss of the water in the monitor water tank and replenishing the bleaching solution tank with water in proportion to the evaporation loss of the water in the bleaching solution tank as described in Japanese Unexamined Patent Publication Nos. 1(1989)-254959 and 1(1989)-254960, or by use of a liquid level sensor or an overflow sensor described in Japanese Patent Application Nos. 2(1990)46743, 2(1990)-47777, 2(1990)-47778, 2(1990)-47779 and 2(1990)-117972. A most preferably method is to add water on the basis of estimation of the evaporation loss. That is, the amount of water to be added is calculated by use of a coefficient obtained in advance on the basis of information on the running time and the down time of the automatic processing machine and the temperature control time.

Further it is necessary to reduce the evaporation loss, for instance, by reducing the opening area or controlling the air flow of the exhaust fan.

It is especially preferable to reduce the evaporation loss by keeping the humidity in the space above the solution in the tank not lower than 80 RH % as described in Japanese Unexamined Patent Publication No. 6(1994)-110171, and it is especially preferably to use an evaporation preventing rack and an automatic roller washing mechanism shown in FIGS. 1 and 2.

The exhaust fan is provided for prevention of moisture condensation during temperature control and the exhaustion rate of the fan is preferably 0.1 to 1 $m^3$/min., and more preferably 0.2 to 0.4 $m^3$/min.

Further the drying condition of the photosensitive material also affects evaporation of the solutions. It is preferred to use a ceramic warm air heater to dry the photosensitive material. An airflow rate of 4 to 20 $m^3$/min is preferable and an airflow rate of 6 to 10 $m^3$/min. is more preferable.

A thermostat for preventing overheat of the ceramic warm air heater is preferably of a type actuated by heat transfer and preferably mounted toward or down the wind through a radiating fin or a heat transfer portion. The drying temperature is preferably controlled depending on the water content of the photosensitive material to be processed, and is optimally at 45° to 55° C. for 35 mm film and at 55° to 65° C. for Blownie film.

Replenisher is preferably replenished by bellows type replenishing pump. When the inner diameter of the delivery tube to the replenishing nozzle is small, back flow of the replenisher is prevented and accuracy in the replenishing amount is improved. The inner diameter of the delivery tube is preferably 1 to 8 mm and more preferably 2 to 5 mm.

Preferable materials of various members in the automatic developing machine are as follows.

The material of the processing tank and the temperature-controlled tank is preferably modified PPO (polyphenylene oxide) or modified PPE (polyphenyleneether). As the modified PPO, Noryl manufactured by Japan GE Plastic is commercially available, and as the modified PPE, "XYRON" manufactured by AsAHI CHEMICAL INDUSTRY CO., LTD. and "Iapiace" manufactured by MITSABISHI GAS CHEMICAL, INC. are commercially available. Further these materials are suitable for the members such as the processing racks and the crossovers which can be brought into contact with the solutions.

The material of the rollers in the processing section is preferably PVC (povynilchloride), PP (polypropylene), PE (polyethylene) or TPX (polymethylpentene) resin. These materials may be used for other members which can be brought into contact with the solutions. PE resin is also preferable for forming replenisher tank by blow molding.

For the processing section, gears, sprockets, bearings and the like, resins such as PA (polyamide), PBT (polybutyleneterephthalate), UHMPE (ultra-high-molecular-weight polyethylene), PPS (polyphenylene sulfide), all aromatic polyesters resin and LCP (liquid crystal polymer) are preferable.

PA resin includes nylon 66, nylon 12 nylon 6 and the like and those containing therein glass fibers or carbon fibers are excellent in resistance to swelling by the processing solution. High-molecular-weight compounds such as MC nylon or compression moldings may be used without fiber-reinforcing. Non-reinforced UHMPE resin is more preferable than reinforced UHMPE resin. For instance, "Ryubuma" "HI-ZEX MILLON" manufactured by MITSU PERTOCHEMICAL INDUSTRIES, LTD. "NEWLIGHT" manufactured by Sakusin Kougyou, "SUNFINE" manufactured by ASHAI CHEMICAL INDUSTRY CO., LTD and the like are suitable. Those having a molecular weight of not smaller than 1,000,000 are preferable and those having a molecular weight of 1,000,000 to 5,000,000 are more preferable.

Glass-fiber- or carbon-fiber-reinforced PPS resin is preferred. LCP resin includes "VICTREX" (ICI Japan), "EXONOL" (SUMITOMO CHEMICAL CO., LTD), "XYDAR" (AMOCO PETRORMANCE PRODUCTS, INC.), "VECTRA" (PolyPlastics) and the like. For the transfer belt, ultra-high-strength polyethylene fibers and polyvinylidene fluoride resin are preferable.

As the soft material for squeeze rollers, expanded vinylchloride resin, expanded silicone resin and expanded urethane resin are suitable. As expanded urethane, "rubycell" manufactured by TOTO POLYMER CO., LTD. is commercially available.

As rubber material for joints of piping or agitation jet pipes or seal members, EPDM rubber, silicone rubber, fluoro rubber E. I. du Pont de Numerous & Company and the like are preferable.

The drying time is preferably 30 seconds to 2 minutes and more preferably 40 seconds to 80 seconds.

Though continuous processing by a replenishing system has been mainly described above, processing may be carried out by batch process where a predetermined amount of processing solution is used without replenishment and then a part or whole of the processing solution is changed before the next processing.

Processing agents employed in the processing may be supplied either in a single condensed solution or in a plurality of condensed solutions. Further they may be supplied in the form of powder, tablets, granule or paste. Further they may be supplied in the form of a working solution or in the form of any combination of condensed solution, powder, tablets, granule, paste and working solution.

In the case of a single condensed solution, it is diluted and used as replenisher. In this case, it is preferred that the developing machine is arranged so that the single condensed solution is automatically diluted by water in a replenisher tank in response to setting the solution to the developing machine. It is preferred that the solution is diluted by water in the washing water replenishing tank as it is. Otherwise, the condensed solution may be directly added to the processing tank and water in an amount corresponding to the dilution value may be directly supplied to the tank. This is especially preferred in a compact developing machine having no replenisher tank.

Also in the case where the processing agents are supplied in a plurality of condensed solutions, it is preferred that the developing machine is arranged so that the condensed solutions are automatically diluted by water in a replenisher tank in response to setting the solutions to the developing machine. It is preferred that the solutions are diluted by water in the washing water replenishing tank as it is. Otherwise, the condensed solutions may be directly added to the processing tank and water in an amount corresponding to the dilution value may be directly supplied to the tank.

Similarly in the case where the processing agents are supplied in the form of powder, tablets, granule or paste, they may be directly added to the processing tank and water in an amount corresponding to the dilution value may be directly supplied to the tank. Also in this case, it is preferred that the developing machine is arranged so that the processing agents are automatically dissolved and diluted by water in a replenisher tank in response to setting the solutions to the developing machine.

Though thee replenisher cartridge may be of material including paper, plastic, metal and the like, the material of the cartridge is preferably is plastic material whose oxygen permeability is not higher than 50 ml/m$^2$·atm·day. The oxygen permeability can be measured by a method described in "O$_2$ permeation of plastic container, Modern Packing" (N.J. Calyan, September, 1968, pp. 143 to 145).

Specifically, PVDC (polyvinyliden chloride), NY (nylon), PE (polyethylene), PP (polypropylene), PES (polyester), EVA (ethylene-vinyl acetate copolymer), EVAL (ethylene-vinyl alcohol copolymer), PAN (polyacrylonitrile), PVA (polyvinyl alcohol), PET (polyethylene terephthalate) and the like are preferable.

PVDC, NY, PE, EVA, EVAL and PET are preferred for the purpose of reduction in oxygen permeability.

The materials described above may be used alone and molded into the cartridge container. A plurality of the materials may be sheeted and a plurality of sheets may be laminated into a composite film and the composite film may be shaped to the cartridge container. The container may be of any shape e.g., may be like a bottle, a cube or a pillow, though it is preferred that the container be like a cube or shapes similar to cube which are flexible and can be easily collapsed after use.

Preferably the composite films is of one of the following structures. That is, PE/EVAL/PE, PE/aluminum foil/PE, NY/PE/NY, NY/PE/EVAL, PE/NY/PE/EVAL/PE, PE/NY/PE/PE/PE/NY/PE, PE/SiO$_2$ film/PE, PE/PVDC/PE, PE/NY/aluminum foil/PE, PE/PP/aluminum foil/PE, NY/PE/

PVDC/NY, NY/EVAL/PE/EVAL/NY, NY/PE/EVAL/NY/, NY/PE/PVDC/NY/EVAL/PE, PP/EVAL/PE, PP/EVAL/PP, NY/EVAL/PE, NY/aluminum foil/PE, paper/aluminum foil/PE, paper/PE/aluminum foil/PE, PE/PVDC/NY/PE, NY/PE/aluminum foil/PE, PET/EVAL/PE, PET/aluminum foil/PE, and PET/aluminum foil/PET/PE.

The thickness of the composite film is generally 5 to 1500μ and preferably 10 to 1000μ. The volume of the container is generally 100 mL to 20 L, and preferably 500 mL to 10 L.

The container may have an outer case of corrugated board or plastic and may be molded integrally with an outer case.

The container of the cartridge may be filled with various processing solutions such as the color-forming developing solution, white and black developing solution, bleaching solution, compensating developer, reversing solution, fixing solution, bleaching/fixing solution, stabilizing solution and the like. The color-forming developing solution, white and black developing solution, fixing solution and bleaching/fixing solution are preferably contained in a container which is especially low in oxygen permeability.

Conventional rigid containers formed of a single layer of HDPE (high-density polyethylene), PVC (polyvinyl chloride) or PET (polyethylene terephthalate) or of a multi-layered material such as NY/PE (nylon/polyethylene) may be used.

Containers which are flexible and can be collapsed after emptied are preferred. For example, a flexible fluid container comprising a flexible container body having bellows formed in a part thereof and a hard neck portion which extends upward from the body and opens upward at its upper end, the body and the neck portion being integrally molded, is disclosed in Japanese Unexamined Patent Publication No. 7(1995)-5670. For example the container body may be substantially rectangular or circular in cross-section.

The flexible container having bellows will be described in more detail, hereinbelow.

The container body may be substantially square, hexagonal, octagonal, circular or oval in a horizontal cross-section.

A square or hexagonal container body is preferred from the viewpoint of reducing the space occupied by the container when it is filled with solution. The number of the bellows is preferably 2 to 20, more preferably 3 to 10 and most preferably 4 to 8.

The depth of valleys in the bellows, that is, the outer dimension of the recessed portions relative to the outer dimension of protrusions, need not be limited to a particular range. However the outer dimension of the recessed portions is not larger than 85%, preferably 40 to 75% and more preferably 50 to 75% of the outer dimension of the protrusions.

Preferably the container can be collapsed to a height not larger than 50%, more preferably not larger than 40% and most preferably 10 to 30% of the overall height of the container before collapsed. It is preferred that the proportion be not less than 10% in designing and production.

The barriering properties to gas of the container can be varied by changing the material. For example, in the case of a container for the developing solution or the like which requires high barriering properties to oxygen, the permeability to gas of the container can be made not higher than 25 ml/m²·day·atm (20° C., 65% RH) and preferably 0.5 to 10 ml/m²·day·atm (20° C., 65% RH) by forming the container in a multiple layer structure including low-density polyethylene such as of low-density polyethylene/copolymer of polyvinyl alcohol and ethylene/low-density polyethylene (LPDE/EVOH/LPDE) or low-density polyethylene/nylon (LPDE/NY).

In the case of a container for the bleaching solution or the like which need not be so high in barriering properties to oxygen, the container may be formed by low-density polyethylene (LDPE) or copolymer of vinyl acetate and ethylene (EVA). The low-density polyethylene has a density of not higher than 0.940 g/cc, preferably 0.90 to 0.94 g/cc and more preferably 0.905 to 0.925 g/cc. In this case, the permeability to gas of the container can be made not lower than 50 ml/m²·day·atm (20° C., 65% RH), e.g., 100 to 5000 ml/m²·day·atm (20° C., 65% RH)

The thicknesses of the neck portion flange portion and the portion therearound may be 1 to 4 mm, preferably 1 to 3 mm, and more preferably 1.2 to 2.5 mm in average. The thickness of the container body may be 0.1 to 1.5 mm, preferably 0.2 to 1.0 mm and more preferably about 0.5 mm. Preferably the difference in thickness between the former and the latter is 0.2 mm and more preferably 0.5 mm.

The proportion of the surface area (cm²) to the internal volume (cm³) of the container should preferably be 0.3 to 1.5 cm⁻¹, more preferably 0.4 to 1.2 cm⁻¹ and most preferably 0.5 to 1.0 cm⁻¹ though the internal volume is variable due to the bellows.

Though is preferred from the viewpoint of stability of the solution that the solution be filled into the container so that the head space (the space in the container above the solution) becomes as small as possible, the solution becomes apt to spill from the container when the head space is too small. Preferably the solution is filled into the container up to 65 to 95% and more preferably 70 to 90%.

The cap or the inside plug of the container is preferably formed of the same material as the container body in order to facilitate recycling the container. Like the container body, the cap or the inside plug can be provided with necessary gas-barriering properties by selecting the material.

The internal volume is preferably 50 mL to 50 L from the viewpoint of handling easiness.

Specific examples (example A to D) of the container are shown in the following tables.

| | A | B |
|---|---|---|
| shape | rectangular | circular |
| perimeter D1 of protrusion of bellows (cm) | 24 | 24 |
| perimeter D2 of recessed portion of bellows (cm) | 16 | 16 |
| D2/D1 (%) | 67 | 67 |
| height before collapsed (cm) | 18 | 18 |
| collapsed height (cm) | 4 | 4 |
| reduction in height (%) | 22 | 22 |
| internal volume V (ml) | 580 | 580 |
| volume of solution filled V1 (ml) | 500 | 500 |
| V/V1 (%) | 86 | 86 |
| body material | LDPE (0.91 g/cc) | LDPE (0.91 g/cc)/NY /LDPE (0.91 g/cc) |
| cap, plug material | LDPE (0.91 g/cc) | LDPE (0.91 g/cc)/NY /LDPE (0.91 g/cc) |
| O₂ permeability (ml/m² · day · atm), 20° C., 65% RH | 100 | 1.0 |
| thickness of body (mm) | 0.5 | 0.5 |
| surface area of container (cm²) | 520 | 505 |

-continued

| | C | D |
|---|---|---|
| shape | rectangular | circular |
| perimeter D1 of protrusion of bellows (cm) | 35 | 35 |
| perimeter D2 of recessed portion of bellows (cm) | 24 | 24 |
| D2/D1 (%) | 67 | 67 |
| height before collapsed (cm) | 31 | 35 |
| collapsed height (cm) | 7 | 8 |
| reduction in height (%) | 23 | 23 |
| internal volume V (ml) | 2300 | 2900 |
| volume of solution filled V1 (ml) | 2000 | 2500 |
| V/V1 (%) | 86 | 86 |
| body material | LDPE (0.91 g/cc)/DPE(0.91 g/cc) | LDPE(0.91 g/cc)/NY (0.91 g/cc) |
| cap, plug material | LDPE (0.91 g/cc)/DPE(0.91 g/cc) | LDPE(0.91 g/cc)/NY (0.91 g/cc) |
| $O_2$ permeability (ml/m² · day · atm), 20° C., 65% RH | 80 | 0.9 |
| thickness of body (mm) | 0.7 | 0.6 |
| surface area of container (cm²) | 1900 | 1940 |

A running test was carried out by use of a standard type rinse cleaning system RC50D. Processing conditions and processing compositions were as follows.

| | temp. (°C.) | time (sec) | replenishment* (ml) |
|---|---|---|---|
| color image | 38.5 | 45 | 45 |
| bleach/fixing | 38.5 | 45 | 35 |
| rinse (1) | 38.0 | 22 | — |
| rinse (2) | 38.0 | 22 | — |
| rinse (3)*** | 38.0 | 22 | — |
| rinse (4)** | 38.0 | 22 | 90 |

*Amount of replenishment per m² of the photosensitive material.
**Four-tank cascade system from rinse (4) to rinse (1).
***Rinse cleaning system RC50D manufactured by Funi Film was set to rinse (3), and rinse solution was taken out from rinse (3) and sent to reverse osmosis membrane module (RC50D) by a pump. Permeating water obtained was supplied to rinse (4) and condensed solution was returned to rinse (3). The pump pressure was adjusted so that the amount of permeating water to the reverse osmosis membrane module was kept within the range of 200 to 300 ml/min and operated for 10 hours a day with the temperature controlled.

| Color-forming developing solution | | |
|---|---|---|
| | tank solution | replenisher |
| cation exchange water (ml) | 800 | 800 |
| dimethylpolysiloxane surfactant (g) silicone KF351A: Shinetsu Kagaku | 0.1 | 0.1 |
| triisopropanolamine (mol) | 0.2 | 0.2 |
| lithium sulfate (g) | 4.5 | 4.5 |
| ethylenediaminetetraacetic acid (g) | 4.0 | 4.0 |
| 4,5-dihydroxybenzene-1,3-disulfonic acid sodium (g) | 0.5 | 0.5 |
| potassium chloride (g) | 10.0 | — |
| potassium bromide (g) | 0.040 | 0.010 |
| calcium sulfate (g) | 0.3 | 0.3 |
| sodium sulfite (g) | 0.1 | 0.1 |
| optical whitening agents | | |
| Hakkol FWA-SF (Shouwa Kagaku) (g) | 2.5 | 4.5 |
| Hakkol OW-10EX (Shouwa Kagaku) (g) | 1.0 | 2.0 |
| diethylhydroxyamine (g) | 3.0 | 6.0 |
| disodium-N, N-bis | 8.5 | 11.1 |

| Color-forming developing solution | | |
|---|---|---|
| | tank solution | replenisher |
| (sulfonateethyl) hydroxylamine (g) N-ethyl-N(β-methane sulfonamide ethyl)-3-methyl-4-amino-4-amino aniline.3/2sulphuric acid.1 water salt (g | 5.0 | 15.7 |
| potassium carbonate (g) | 26.3 | 26.3 |
| added with water (ml) | 1000 | 1000 |
| pH (25° C./KOH, or sulphuric acid) | 10.15 | 12.45 |

Bleaching/fixing replenisher

The following part A (500 ml) and the following part B were mixed together into 1000 ml.

| Part A | |
|---|---|
| water | 250 ml |
| ethylenediaminetetraacetic acid ferric ammonium | 0.23 mol |
| compound (S-7) | 0.18 mol |
| added with water | 500 ml |
| pH (25° C./ammonium nitrate water) | 6.0 |
| Part B | |
| water | 100 ml |
| ammonium thiosulfate (75 g/l) | 210 ml |
| ammonium sulfite | 90 g |
| imidazole | 0.2 mol |
| added with water | 500 ml |
| pH (25° C./ammonium nitrate water) | 6.0 |

Bleaching/fixing tank solution

Each of part A and part B of the bleaching/fixing replenisher described above was added to 500 ml water in an amount of 250 ml.

| Rinse (common to tank solution and replenisher) | |
|---|---|
| sodium chlorinated isocyanuric acid | 0.2 g |
| deionized water (conductivity not higher than 5 μs/cm) | 1000 ml |
| pH | 6.5 |

The color-forming developing solution and the bleaching-fixing replenisher were prepared as follows in flexible containers having bellows described above.

| color-forming developing solution | 2500 ml container D |
|---|---|
| bleaching-fixing replenisher | |
| part A | 2000 ml container C |
| part B | 2000 ml container C |

The running test was continued until the replenishing amount of the color-forming solution reached 50 liters in total.

What is claimed is:

1. An image recording method comprising:

exposing a photosensitive material to light modulated according to an image signal;

developing the exposed photosensitive material so that the image represented by the image signal is recorded on the photosensitive material as a visible image; and reducing an effect of a latent image regression phenomenon of the photosensitive material by delaying starting of developing of said exposed photosensitive material for a predetermined time after the exposing.

2. An image recording apparatus comprising:

exposure means for exposing a photosensitive material to light modulated according to an image signal;

developing means for developing the exposed photosensitive material so that the image represented by the image signal is recorded on the photosensitive material as a visible image; and a controller which controls the developing means to delay developing of said exposed photosensitive material for a predetermined time after the exposure in which a latent image regression phenomenon of the photosensitive material is substantially stabilized.

3. An image recording method comprising:

exposing a photosensitive material to light modulated according to an image signal;

developing the exposed photosensitive material so that the image represented by the image signal is recorded on the photosensitive material as a visible image; and delaying starting of developing of said exposed photosensitive material for a predetermined time after the exposing, wherein said delaying includes controlling transfer of the exposed photosensitive material between the exposing and the developing.

4. The method according to claim 3, wherein said controlling includes delaying transfer of the exposed photosensitive material from the exposing to the developing steps by said predetermined time.

5. The apparatus of claim 2, further comprising transfer means for transferring the exposed photosensitive material between said exposure means and said developing means.

6. The apparatus of claim 5, further comprising a timer, wherein said controller prevents said transfer means from transferring the exposed photosensitive material from said exposure means to said developing means until said timer indicates said predetermined time has lapsed.

* * * * *